(12) United States Patent
Migunova et al.

(10) Patent No.: US 11,010,031 B2
(45) Date of Patent: May 18, 2021

(54) CREATING AND/OR EDITING INTERACTIONS BETWEEN USER INTERFACE ELEMENTS WITH SELECTIONS RATHER THAN CODING

(71) Applicant: salesforce.com, inc., San Francisco, CA (US)

(72) Inventors: Elena Migunova, Castro Valley, CA (US); Edouard Picot, Moraga, CA (US); Chockalingam Kandasamy, Dublin, CA (US); David May, Concord, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/563,812

(22) Filed: Sep. 6, 2019

(65) Prior Publication Data
US 2021/0072883 A1 Mar. 11, 2021

(51) Int. Cl.
*G06F 3/0484* (2013.01)
*G06F 3/0482* (2013.01)

(52) U.S. Cl.
CPC ........ *G06F 3/04845* (2013.01); *G06F 3/0482* (2013.01)

(58) Field of Classification Search
CPC ........................... G06F 3/04845; G06F 3/0482
See application file for complete search history.

(56) References Cited

U.S. PATENT DOCUMENTS

| | | | |
|---|---|---|---|
| 7,730,478 B2 | 6/2010 | Weissman | |
| 9,990,110 B1* | 6/2018 | Lounibos | G06F 3/04845 |
| D881,935 S | 4/2020 | Samanta et al. | |
| 2009/0064029 A1* | 3/2009 | Corkran | G06F 3/0482 |
| | | | 715/781 |
| 2010/0169832 A1* | 7/2010 | Chang | G06F 16/954 |
| | | | 715/811 |
| 2011/0249003 A1* | 10/2011 | Mercuri | G06T 11/206 |
| | | | 345/440 |
| 2015/0082219 A1* | 3/2015 | Beck | G06Q 10/06398 |
| | | | 715/771 |

(Continued)

OTHER PUBLICATIONS

Gebhardt, J., "Create Amazon QuickSight dashboards that have impact with parameters, on-screen controls, and URL actions," Amazon QuickSight, AWS Big Data Blog, Sep. 4, 2018, downloaded from https://aws.amazon.com/blogs/big-data/create-amazon-quicksight-dashboards-that-have-impact-with-parameters-on-screen-controls-and-url-actions/ on Sep. 6, 2019, 27 pages.

(Continued)

*Primary Examiner* — Angie Badawi
(74) *Attorney, Agent, or Firm* — Nicholson De Vos Webster & Elliott LLP

(57) ABSTRACT

Methods and systems are described that enable a user designing a dashboard to make selections of user interface (UI) elements rather than coding to create and/or edit an interaction between UI elements. UI elements are displayed that allow a user to select a control UI element and a type of interaction. Selections from the user of a type of interaction and of UI elements as target and control UI elements are accepted. The control and target UI elements are displayed in the dashboard and a definition for the interaction is stored. Responsive to a trigger, the interaction is performed.

22 Claims, 12 Drawing Sheets

(56) References Cited

U.S. PATENT DOCUMENTS

| | | | |
|---|---|---|---|
| 2015/0356160 A1* | 12/2015 | Berwick | G06F 3/04845 715/781 |
| 2016/0103592 A1* | 4/2016 | Prophete | G06F 3/04842 715/771 |
| 2019/0065014 A1* | 2/2019 | Richter | G06F 9/451 |
| 2020/0058067 A1* | 2/2020 | Parker | G06F 3/0482 |

OTHER PUBLICATIONS

Microsoft Docs, "Add a filter to a report in Power BI," Jun. 25, 2019, downloaded from https://docs.microsoft.com/en-us/power-bi/power-bi-report-add-filter on Sep. 6, 2019, 12 pages.

Microsoft Docs, "Change how visuals interact in a Power BI report," Feb. 11, 2019, downloaded from https://docs.microsoft.com/en-us/power-bi/service-reports-visual-interactions on Sep. 6, 2019, 4 pages.

Microsoft Docs, "Filters and highlighting in Power BI reports," May 22, 2019, downloaded from https://docs.microsoft.com/en-us/power-bi/power-bi-reports-filters-and-highlighting on Sep. 6, 2019, 7 pages.

Microsoft Docs, "How visuals cross-filter each other in a Power BI report," May 29, 2019, downloaded from https://docs.microsoft.com/en-us/power-bi/consumer/end-user-interactions > on Sep. 6, 2019, 3 pages.

Microsoft Docs, "Slicers in Power BI," May 14, 2019, downloaded from https://docs.microsoft.com/en-us/power-bi/visuals/power-bi-visualization-slicers on Sep. 6, 2019, 14 pages.

salesforce.com, inc., "Analytics Bindings Developer Guide," Spring '18, Feb. 8, 2018, downloaded from https://developer.salesforce.com/docs/atlas.en-us.212.0.bi_dev_guide_bindings.meta/bi_dev_guide_bindings/bi_dbjson_bindings.htm, 79 pages.

salesforce.com, inc., "Analytics Bindings Developer Guide," Spring '19, Apr. 17, 2019, downloaded from https://developer.salesforce.com/docs/atlas.en-us.218.0.bi_dev_guide_bindings.meta/bi_dev_guide_bindings/bi_dbjson_bindings.htm, 76 pages.

salesforce.com, inc., "Analytics Bindings Developer Guide," Summer '17, Aug. 9, 2017, downloaded from https://developer.salesforce.com/docs/atlas.en-us.208.0.bi_dev_guide_bindings.meta/bi_dev_guide_bindings/bi_dbjson_bindings.htm, 76 pages.

salesforce.com, inc., "Analytics Bindings Developer Guide," Summer '18, Jun. 20, 2018, downloaded from https://developer.salesforce.com/docs/atlas.en-us.214.0.bi_dev_guide_bindings.meta/bi_dev_guide_bindings/bi_dbjson_bindings.htm, 76 pages.

salesforce.com, inc., "Analytics Bindings Developer Guide," Summer '19, Jun. 24, 2019, downloaded from https://developer.salesforce.com/docs/atlas.en-us.bi_dev_guide_bindings.meta/bi_dev_guide_bindings/bi_dbjson_bindings.htm, 76 pages.

salesforce.com, inc., "Analytics Bindings Developer Guide," Winter '18, Nov. 28, 2017, downloaded from https://developer.salesforce.com/docs/atlas.en-us.216.0.bi_dev_guide_bindings.meta/bi_dev_guide_bindings/bi_dbjson_bindings.htm, 76 pages.

salesforce.com, inc., "Analytics Bindings Developer Guide," Winter '19, Dec. 4, 2018, downloaded from https://developer.salesforce.com/docs/atlas.en-us.216.0.bi_dev_guide_bindings.meta/bi_dev_guide_bindings/bi_dbjson_bindings.htm, 76 pages.

salesforce.com, inc., "Analytics Bindings Developer Guide," Winter '20, Preview, Aug. 15, 2019, https://developer.salesforce.com/docs/atlas.en-us.222.0.bi_dev_guide_bindings.meta/bi_dev_guide_bindings/bi_dbjson_bindings.htm, 76 pages.

salesforce.com, inc., "Analyze Your Data," Summer '18, Aug. 23, 2018, available online at < https://developer.salesforce.com/einstein-analytics#section_0 >, 1204 pages.

salesforce.com, inc., "Wave Analytics Bindings Developer Guide," Spring '17, Mar. 30, 2017, downloaded from https://developer.salesforce.com/docs/atlas.en-us.206.0.bi_dev_guide_bindings.meta/bi_dev_guide_bindings/bi_dbjson_bindings.htm, 73 pages.

salesforce.com, inc., "Wave Analytics Bindings Developer Guide," Winter '17, Nov. 22, 2016, downloaded from https://developer.salesforce.com/docs/atlas.en-us.204.0.bi_dev_guide_bindings.meta/bi_dev_guide_bindings/bi_dbjson_bindings.htm, 72 pages.

Tableau Software, "Actions," Version: 2019.2, downloaded from https://help.tableau.com/current/pro/desktop/en-gb/actions.htm on Sep. 6, 2019, 87 pages.

\* cited by examiner

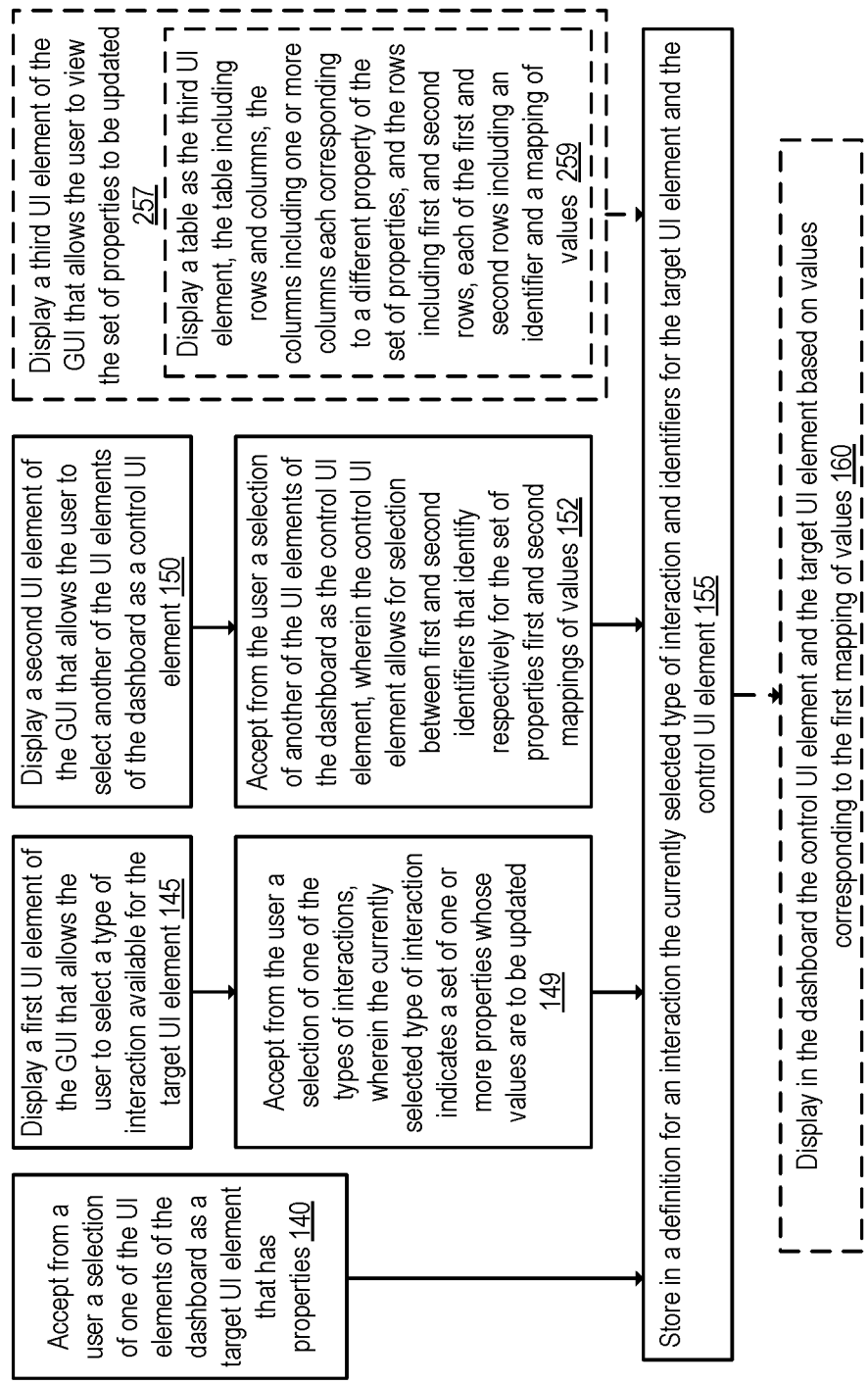

CREATING AND/OR EDITING INTERACTIONS BETWEEN USER INTERFACE ELEMENTS WITH SELECTIONS RATHER THAN CODING

TECHNICAL FIELD

One or more implementations relate to the field of graphical user interface dashboards; and more specifically, to designing such dashboards.

BACKGROUND ART

A dashboard is a user interface (UI) for visualizing data, typically presented on a single screen of a device in either a web browser or a native application. Many businesses use dashboards to display data for viewing by multiple users. For example, a business may use a dashboard which displays information related to sales. Such a dashboard may include various visualizations (i.e., a graphical depiction of data, such as a chart, a graph, or a map). For example, a dashboard may include a visualization of sales per geographical region and a visualization of profit margin per product line.

Dashboards may offer limited interactivity. For example, a dashboard may be designed such that a user of the dashboard can select one or more filters which are applied to data displayed by one visualization (referred to as filtering) or by more than one visualization (referred to as cross-filtering). Alternatively, a dashboard may be designed such that when a user of the dashboard selects an aspect of a visualization (e.g., a region in a map), corresponding aspects of another visualization are highlighted (e.g., data for that region displayed in a graph), or aspects of multiple other visualizations are highlighted (also referred to as cross-highlighting).

A GUI used for designing dashboards may allow a user to create interactions in a dashboard using code. For example, a user may be able to associate code with a UI element in a dashboard such that the code is executed when a trigger is fired (e.g., a user selects the UI element). "UI element" means an element of which a user interface is comprised, such as an input element (e.g., dropdown, toggle), navigation element (e.g., search field, icon), informational element (e.g., text label, visualization), and/or container element (e.g., accordion). "Code" means software instructions (also referred to as just software or instructions) that can be interpreted and/or executed by an electronic device or software executing on an electronic device. Examples of code include software written in a programming language (e.g., JavaScript, Python, Java, C++, etc.), formulas written in a formula language (e.g., for Matlab, Microsoft Excel, Salesforce Analytics Bindings, etc.), and software which can be directly executed by a processor (e.g., machine code) or a virtual machine (e.g., bytecode). "Coding" is the act of a person writing code.

Alternatively, a user may be able to create cross-filtering or cross-highlighting interactions by selecting a visualization and then selecting a cross-filtering or cross-highlighting option for that visualization. "Selecting" means the act of selecting one or more elements of a set of one or more elements. For example, a user of the GUI may select a UI element through an input such as one or more mouse-clicks, keypresses, gestures, and/or voice commands.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2C is a more detailed flow diagram illustrating an exemplary way for a user creating an interaction to view the set of properties to be updated, according to some example implementations.

DETAILED DESCRIPTION

Figure 1A:
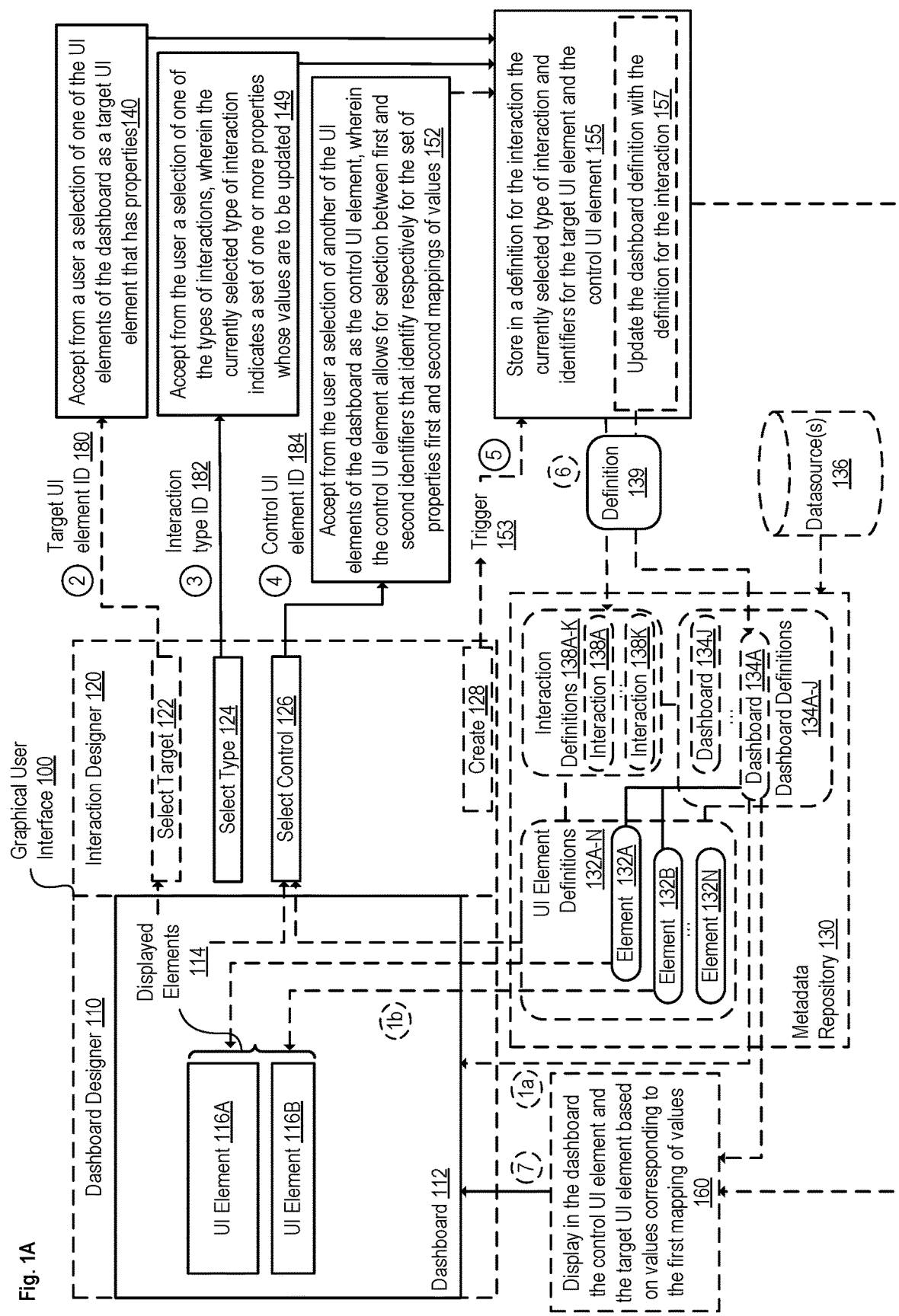
FIG. 1A is a block diagram illustrating a GUI that enables a user designing a dashboard to create an interaction between UI elements of the dashboard, according to some example implementations.

The following description describes implementations for creating an interaction between a plurality of UI elements of a dashboard. Implementations include a GUI that enables selections of a plurality of UI elements of a dashboard to be made. In some implementations, the GUI displays a first plurality of UI elements of the GUI. The GUI accepts a selection of a UI element of the dashboard as a target UI element, a selection of a type of interaction, and the selection of another UI element of the dashboard as a control UI element. The target UI element has properties. The type of interaction indicates one or more of the properties whose values are to be updated. The control UI element allows for selection between identifiers that identify different mappings of values for the one or more properties. The type of interaction and identifiers for the target and control UI elements are stored in a definition for the interaction. In the dashboard, the target and control UI elements are displayed with values corresponding to a first mapping of values. The interaction is performed responsive to triggering the control UI element; performing the interaction includes updating the one or more properties of the target UI element with values corresponding to a different mapping of values.

Implementations provide an improvement over approaches that only allow for limited types of interactions between UI elements. Rather than only allowing limited types of interactions, implementations described herein allow for creating types of interactions which 1) indicate multiple properties rather than only one property of a target UI element to be updated; 2) indicate any property of a target UI element to be updated rather than only limited properties/types of interactions (e.g., filtering, cross-filtering, and/or cross-highlighting); and/or 3) can apply to any type of UI element rather than only visualizations. Moreover, types of interactions can be customized by the user (e.g., to change alternative or additional properties of UI elements). Thus, implementations described herein may provide more configurable and richer interactions between UI elements in a dashboard.

Moreover, implementations described herein provide an improvement over approaches that involve coding to create interactions in a dashboard. Implementations that allow for making selections rather than coding to create a dashboard can better control how interactions are created. This in turn can make creating interactions simpler, more robust, more maintainable, and/or more secure. Writing code to implement an interaction may require specialized knowledge or skill (e.g., of a formula or programming language). Thus, creating an interaction with code may effectively be reserved for users with specialized knowledge and/or skill (or users with access to same). Making selections rather than coding may therefore allow more users to create interactions in dashboards. Additionally, creating an interaction with coding may require a user to manually investigate the underlying datasource(s) referenced by UI elements of a dashboard (e.g., to identify values of properties to be updated), and/or manually investigate the UI elements available or displayed in a dashboard. Thus, creating an interaction with coding may be more complicated, time-consuming, and/or costly; making selections rather than coding may be simpler, faster, and less costly. Coding may also introduce errors or security flaws. Making selections rather than coding is thus likely to be more robust and more secure because coding is not required. Also, errors are more likely to be discovered earlier; e.g., at the time of creating an interaction rather than when the interaction is performed. In turn, this may reduce costs associated with errors.

FIG. 1A is a block diagram illustrating a GUI that enables a user designing a dashboard to create an interaction between UI elements of the dashboard, according to some example implementations. An interaction means, responsive to a trigger (e.g., selection of a control UI element by a user), updating a set of one or more properties of a target UI element with values identified by a control UI element. A control UI element is a UI element which is to provide values for one or more properties of the target UI element in the context of an interaction, and a target UI element is a UI element with one or more properties to be updated in that context. Target UI element and control UI element are discussed in greater detail below.

FIG. 1A shows a graphical user interface 100 which optionally includes a dashboard designer 110 and/or an interaction designer 120. The graphical user interface 100 includes a dashboard 112. The dashboard 112 includes displayed elements 114. The displayed elements 114 include exemplary UI elements: UI element 116A and UI element 116B. The dashboard may include other UI elements, of which some, all, or none are displayed in the dashboard.

The interaction designer 120 includes several exemplary UI elements: 1) an optional UI element designated as "Select Target 122"; 2) a UI element designated as "Select Type 124"; 3) a UI element designated as "Select Control 126"; and 4) an optional UI element designated as "Create 128". In some implementations, interaction designer 120, dashboard designer 110, and/or graphical user interface 100 may include other UI elements (not shown).

The optional UI element designated as "Select Target 122" allows a user to select a UI element of the dashboard as a target UI element. The target UI element may be any kind of UI element that has one or more properties to be updated. In the context of a UI element, a property is a parameter or attribute of the UI element which can affect the visual characteristics of the UI element. For example, a text entry box may have a label property, a tooltip property, a default width property, a font property, a font size property, etc.; a bar chart may have a title property, measure property, a grouping property, and properties for axes (e.g., labels, units, etc.).

Some properties of a UI element may be associated with data in one or more datasources where the UI element is based on that data (e.g., a bar chart may be based on data in records of one or more database objects and have a grouping property associated with that data). Changing a value of such a property of a UI element may result in a request (e.g., a query, an application programming interface (API) call, etc.) to the corresponding one or more datasource(s) for data specified, at least in part, by the changed value of the property of the UI element (e.g., a query on the database object(s) may include a query property, parameter, clause, statement, attribute, etc. that is based, at least in part, on the changed value for the grouping property of the UI element). If the data returned responsive to the request and that the UI element is based on is different from that on which the UI element previously was based, the UI element will change (e.g., the bar chart may reflect the changed value for the grouping).

The UI element designated as "Select Type 124" allows a user to select a type of interaction available for the target UI element. The type of interaction indicates a set of one or more properties whose values are to be updated. Thus, "type of interaction" means one or more interactions which involve the same one or more properties of the target UI element of the interaction being updated. Examples of types of interaction include changing the measure or grouping of a visualization, changing the background color of a UI element, or changing one or more other properties. A measure is data on which an operation can be performed. Examples of measures include revenue (e.g., on which a summation or averaging operation can be performed), units sold (e.g., on which a summation or averaging operation can be performed), profit margin, etc. A grouping is a set of one or more characteristics of a measure. Examples of groupings include geographical groupings (e.g., country, state, province), time-based groupings (e.g., year, quarter, month, week), or business-related groupings (e.g., product number, product line, marketing channel, etc.).

The UI element designated as "Select Control 126" allows a user to select another UI element of the dashboard as a control UI element. The control UI element allows for selection between mappings of values for one or more properties of one or more target UI elements. In some implementations, a control UI element is associated with identifiers that identify different mappings of values for the one or more properties ("identifier" means data which can be used to identify an object in a given scope). In some implementations, the control UI element may display one or more of the identifiers. Additionally or alternatively, the control UI element or data associated with it could include the mappings of values (e.g., the control UI element could store or reference the mappings of values). Alternatively, those mappings of values could be associated with another UI element. In other implementations, one or more mappings of values could be associated with datasources, such as fields of records of one or more database objects.

The optional UI element designated as Create 128 allows a user to save an interaction. Create 128 may be implemented as a button with an appropriate label (e.g., "Save"). Selecting the button may then cause trigger 153 to be fired. In some implementations, Create 128 is not implemented. When Create 128 is not implemented, trigger 153 may be fired one or more times on accepting a user's selections of one or more of a target UI element, a control UI element, and/or a type of interaction. Regardless whether Create 128 is implemented, some implementations may perform sanity checking before or after firing trigger 153, as discussed in more detail below.

FIG. 1A also shows an optional metadata repository 130. Metadata is data which describes other data. For example, metadata for a graph may include data describing one or more properties of a graph (e.g., horizontal axis, vertical axis, title, measure(s), grouping(s), etc.). As shown in FIG. 1A, the metadata repository 130 optionally includes UI element definitions 132A-N, dashboard definitions 134A-J, and/or interaction definitions 138A-K. The metadata repository 130 may also include other elements which are not shown in FIG. 1A (e.g., one or more interfaces such as an API for programmatic access to the repository, a GUI viewer for viewing the repository's contents, etc.).

Metadata stored in the metadata repository 130 may be associated with other metadata stored in the metadata repository. For example, one or more of dashboard definitions 134A-J may optionally reference one or more UI element definitions 132A-N and/or one or more interaction definitions 138A-K as indicated by the dashed lines between dashboard definitions 134AJ, UI element definitions 132A-N, and interaction definitions 138A-K. In the example shown in FIG. 1A, dashboard 112 includes UI element 116A and UI element 116B. Dashboard 112 corresponds to the dashboard definition 134A, shown by the dashed line between the dashboard definition 134A and block 160 (discussed later herein), and between the dashboard definition 134A and dashboard 112. Also as shown by dashed lines, UI element 116A corresponds to UI element definition 132A, and UI element 116B corresponds to UI element definition 132B. One or more of dashboard definitions 134A-J, and one or more of UI element definitions 132A-N, may optionally be associated with one or more datasource(s) 136. For example, UI element 116A could be a visualization based on data provided by one or more datasource(s) 136 (e.g., database objects, feeds, data streams, etc.).

FIG. 1A also shows an exemplary sequence of operations for a user to make selections to create an interaction. At time 1, the dashboard 112 is displayed in the graphical user interface 100. Specifically, at time 1a, dashboard definition 134A is optionally retrieved from dashboard definitions 134A-J in optional metadata repository 130. Dashboard 112 is optionally constructed from dashboard definition 134A. Constructing dashboard 112 optionally includes, at time 1b, displaying UI element 116A and UI element 116B as displayed elements 114. UI element 116A and UI element 116B are optionally constructed from respective UI element definition 132A and UI element definition 132B which are optionally referenced by dashboard definition 134A.

At time 2, block 140 is executed. Block 140 includes accepting from a user a selection of one of the UI elements of the dashboard as a target UI element, wherein the target UI element has properties. The selected target UI element may be identified by target UI element ID 180.

At time 3, block 149 is executed. Block 149 includes accepting from the user a selection of one of the types of interactions, wherein the currently selected type of interaction indicates a set of one or more properties whose values are to be updated. The selected type of interaction may be identified by interaction type ID 182.

At time 4, block 152 is executed. Block 152 includes accepting from the user a selection of another of the UI elements of the dashboard as a control UI element, wherein the control UI element allows for selection between first and second identifiers that identify respectively for the set of properties first and second mappings of values. The selected control UI element may be identified by control UI element ID 184.

At time 5, block 155 is executed responsive to trigger 153. Block 155 includes storing in a definition for the interaction the currently selected type of interaction (e.g., interaction type ID 182) and identifiers for the target UI element and the control UI element (e.g., target UI element ID 180 and control UI element ID 184 respectively). Optionally, block 157 is also executed. Block 157 includes updating the dashboard definition with the definition for the interaction. For example, in the example shown in FIG. 1A, block 157 includes updating dashboard definition 134A (corresponding to dashboard 112) in metadata repository 130 with the definition for the interaction (i.e., definition 139). In implementations which include interaction definitions 138A-K, block 157 may optionally include storing the definition for the interaction (i.e., definition 139) with interaction definitions 138A-K. One of skill in the art will recognize that implementations may store information for the interaction otherwise. For example, the currently selected type of interaction and identifiers for the target and control UI elements could be stored directly in or associated with the dashboard 112 and/or dashboard definition 134A (whether or not the currently selected type of interaction and identifiers are considered a definition for the interaction).

From block 155, flow optionally passes to block 160. Block 160 includes displaying in the dashboard the control UI element and the target UI element based on values corresponding to the first mapping of values (not shown). However, execution of block 160 is optional at time 7. For example, the target and control UI elements may already be displayed in the dashboard, the target UI element based on values corresponding to the first mapping of values (e.g., this may have occurred at time 1b). In such a case, execution of block 160 at time 7 may not be necessary. Alternatively, the target UI element may initially be displayed with values different from those corresponding to the first mapping. At time 7, displaying the target UI element based on values corresponding to the first mapping is effectively refreshing the target UI element. Alternatively, the UI element corresponding to the control UI element may be created after time 1 and before block 140 (not shown). In that case, execution of block 160 would display the control UI element where that element was not previously displayed. Thus, block 160 or variations thereof may be executed at different times and/or combinations of times in different implementations; e.g., at time 1*b*, at time 1*b* and at time 7, at time 7, etc.

The exemplary sequence shown in FIG. 1A provides notable advantages. For example, executing block 140 (accepting a selection of a target UI element) before executing block 149 (accepting a selection of a type of interaction) is intuitive; the user may be creating an interaction of a given type for the selected target UI element. Also, executing block 140 before executing block 149 allows for suggesting types of interactions to the user (e.g., only those types of interactions which are available for the selected target UI element). For another example, executing block 149 (accepting a selection of a type of interaction) before executing block 152 (accepting a selection of a control UI element) allows for verifying that the control UI element includes mappings of values for the properties indicated by the type of interaction.

Other sequences of operations may provide other advantages. For example, executing block 140 (accepting a selection of a target UI element) and block 152 (accepting a selection of a control UI element) before executing block 149 (accepting a selection of a type of interaction) may allow for inferring a type of interaction (e.g., by matching one or more properties of the selected target UI element with properties for which the selected control UI element identifies mappings of values). This inferred type of interaction could then be suggested to the user before executing block 149, whose execution could be optional in some implementations.

Implementations may also support interactions between a control UI element and a plurality of target UI elements. In such implementations, performing the interaction includes updating the set of properties of the plurality of target UI element with the values corresponding to the second mapping (alternatively, for each target UI element, only the properties that target UI element has are updated). Such implementations may accept from the user a selection of more than one UI element of the dashboard as target UI elements, store in the definition for the interaction identifiers for each of those target UI elements (together with an identifier for the control UI element and type of interaction), and display in the dashboard the target UI elements based on the values of a first mapping of values.

Figure 1B:
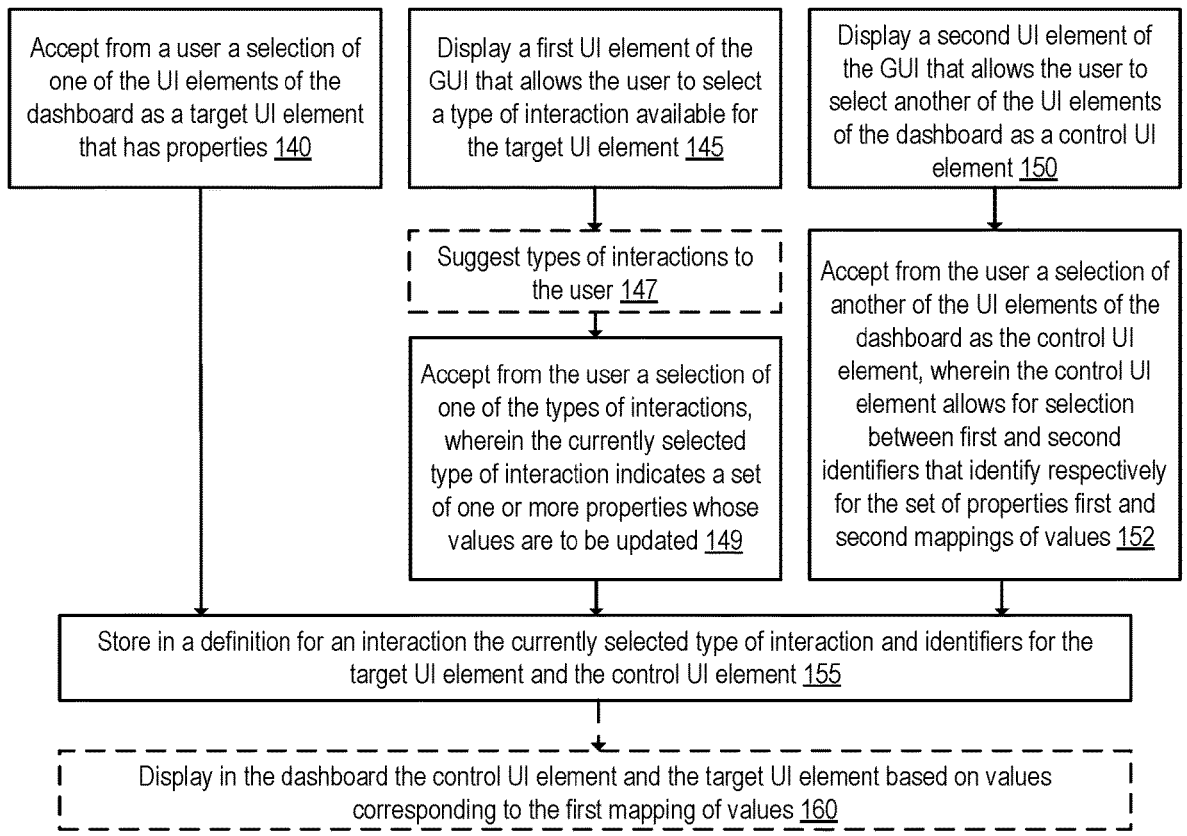
FIG. 1B is a flow diagram illustrating an exemplary way for a user designing a dashboard to make selections rather than coding to create an interaction, according to some example implementations.

FIG. 1B is a flow diagram illustrating an exemplary way for a user designing a dashboard to make selections rather than coding to create an interaction, according to some example implementations.

In block 145, a first UI element of the GUI is displayed. The first UI element of the GUI allows the user to select a type of interaction available for the target UI element. For example, with reference to FIG. 1A, the first UI element of the GUI could be the UI element designated as Select Type 124. A type of interaction may be available for the target UI element depending on several considerations; e.g., the properties that the target UI element has, the types of interactions supported by the implementation, the functionality licensed for the user, etc. From block 145, flow passes to optional block 147 if implemented, or to block 149 otherwise.

In optional block 147, types of interactions are suggested to the user. Types of interactions could be suggested based on one or both of the target and control UI elements, if one or both of those elements have already been selected. For example, if a target UI element has been selected, types of interactions could be suggested based on the target UI element's properties. Additionally or alternatively, types of interactions could be suggested based on commonly-used types of interactions, or commonly-used types of interactions for that target UI element (if selected). If a control UI element has been selected, types of interactions could be suggested based on the properties for which the control UI element identifies mappings of values. If both control and target UI elements have been selected, types of interactions could be suggested based on those types being commonly suggested based on the target UI element and the control UI element (e.g., by matching types of interactions that are suggested based on the target UI element with types of interactions that are suggested based on the control UI element). As one of skill in the art will recognize, types of interactions could be suggested based on other information (e.g., other elements displayed or available in the dashboard, the user designing the dashboard, any datasource(s) used by the dashboard or its elements, other interactions that have been created and their corresponding types, themes or other aesthetic considerations for the dashboard, etc.). Moreover, one of skill in the art will recognize that block 147 could be executed before, after, or as part of execution of block 145. From block 147, flow passes to block 149, which was discussed with reference to FIG. 1A.

In block 150, a second UI element of the GUI is displayed. The second UI element of the GUI allows the user to select another of the UI elements of the dashboard as a control UI element. For example, with reference to FIG. 1A, the second UI element of the GUI could be the UI element designated as Select Control 126. From block 150, flow passes to block 152.

In block 152, a selection of another of the UI elements of the dashboard is accepted as the control UI element. In some implementations, the control UI element allows for selection between mappings of values. In some implementations, a first mapping of values may be associated with a first plurality of fields of one or more of datasource(s) 136 and a second mapping of values may be associated with a different plurality of fields of the same or different datasource(s) 136. In some implementations, the mappings of values are each identified with a unique identifier, which may be displayed by the control UI element (e.g., to facilitate a user triggering the control UI element).

From blocks 140, 149, and 152, flow passes to block 155. Alternatively, one or more of blocks 140, 149, and/or 152 could be executed sequentially. In block 155, the currently selected type of interaction and identifiers for the target UI element and the control UI element are stored in a definition for an interaction. With reference to FIG. 1A, the definition for the interaction may optionally be stored in metadata repository 130, and, if implemented, stored or referenced in one or more of interaction definitions 138A-K, dashboard definitions 134A-J, and/or UI element definitions 132A-N. In other implementations, the definition for the interaction may be stored in the dashboard itself (e.g., in dashboard 112). One of skill in the art will also recognize that alternative implementations to those shown in FIG. 1B may include incrementally storing information in a definition for the interaction, rather than block 155. For example, after execution of block 149, the currently selected type of interaction could be stored in a definition for the interaction.

Either before or after execution of block 149 but after execution of block 140, an identifier for the target UI element could be stored in the definition for the interaction. Before or after one or both of blocks 140 and 149, but after execution of block 152, an identifier for the control UI element could be stored in the definition for the interaction. From block 155, flow optionally passes to block 160.

In block 160, the control UI element and the target UI element based on values corresponding to the first mapping of values are displayed in the dashboard. As previously discussed, block 160 is optional because, for example, one or both of the control and target UI elements may or may not be already displayed, and/or the target UI element may or may not be already displayed based on values corresponding to the first mapping of values.

In other implementations which support a plurality of target UI elements (not shown), the flow illustrated in FIG. 1B may differ. For example, block 140 may involve accepting from the user a selection of a plurality of UI elements of the dashboard as target UI elements. Alternatively, block 140 may be executed a plurality of times and additional UI elements accepted from a user as additional target UI elements. Block 155 may further involve storing identifiers for the plurality of target UI elements in the definition for the interaction. Block 160 may include displaying in the dashboard the plurality of target UI elements based on values corresponding to the first mapping of values.

Figure 1C:
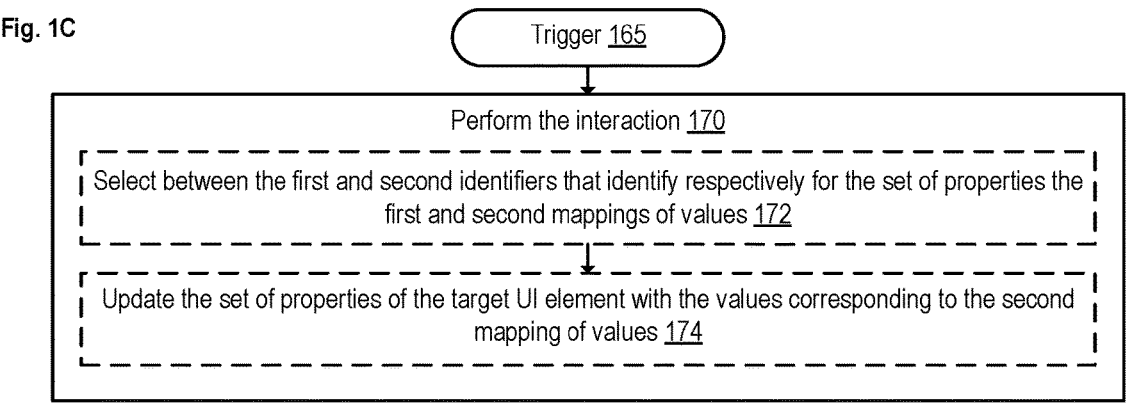
FIG. 1C is a flow diagram illustrating an exemplary way for an interaction to be performed responsive to a trigger.

FIG. 1C is a flow diagram illustrating an exemplary way for an interaction to be performed responsive to a trigger. Trigger 165 may represent different UI events from user interaction (e.g., mouse-clicks or mouse movement, keypresses, gestures, etc.); and in some implementations, also include UI events simulated by a computer program and/or programmatic events (e.g., a computer program making an API call on the dashboard service). The event(s) represented by trigger 165 may depend on the control UI element; e.g., trigger 165 may represent triggering of the control UI element. For example, if the control UI element is a clickable button, then trigger 165 may represent a selection (e.g., a mouse-click event, a keypress event, etc.) on that button. Alternatively, if the control UI element is a dropdown, then trigger 165 may represent a change event on the dropdown (e.g., an element of the dropdown being selected).

In some implementations, the event(s) represented by trigger 165 are unrelated to the control UI element however. For example, trigger 165 may represent a resize event on the dashboard or on a tile in which the target UI element is displayed. As mentioned, UI events may be simulated by a computer program (e.g., a UI automation tool), or trigger 165 could represent programmatic events. For example, trigger 165 may represent the output of one or more data-source(s) 165 satisfying one or more criteria (e.g., a stock price crossing a threshold price). Some implementations may allow the trigger 165 to be specified by the user (e.g., optionally as part of block 152 in FIG. 1B, optionally responsive to displaying another UI element of the GUI that allows the user to specify one or more triggers, etc.). Other implementations may configure trigger 165 by default (e.g., configure trigger 165 such that it represents a default event on the control UI element). Yet other implementations may allow the user to customize the default configuration, etc.

Responsive to trigger 165, flow passes to block 170. In block 170, the interaction is performed. Performing the interaction optionally includes executing one or both of blocks 172 and 174. Block 172 includes selecting between first and second identifiers that identify respectively for the set of properties the first and second mappings of values. In some implementations, block 172 may include selecting between the first and second mappings of values directly (i.e., without selecting between first and second identifiers). For example, a control UI element may enable identifying a mapping of values by the content of that mapping and without an identifier. From block 172, flow passes to block 174 if block 174 is implemented. In block 174, the set of properties of the target UI element is updated with the values corresponding to the second mapping of values. Alternatively, in implementations which support a plurality of target UI elements, each of those target UI elements is updated to the extent that the target UI element has the set of properties.

Use of Tables

Figure 2A:
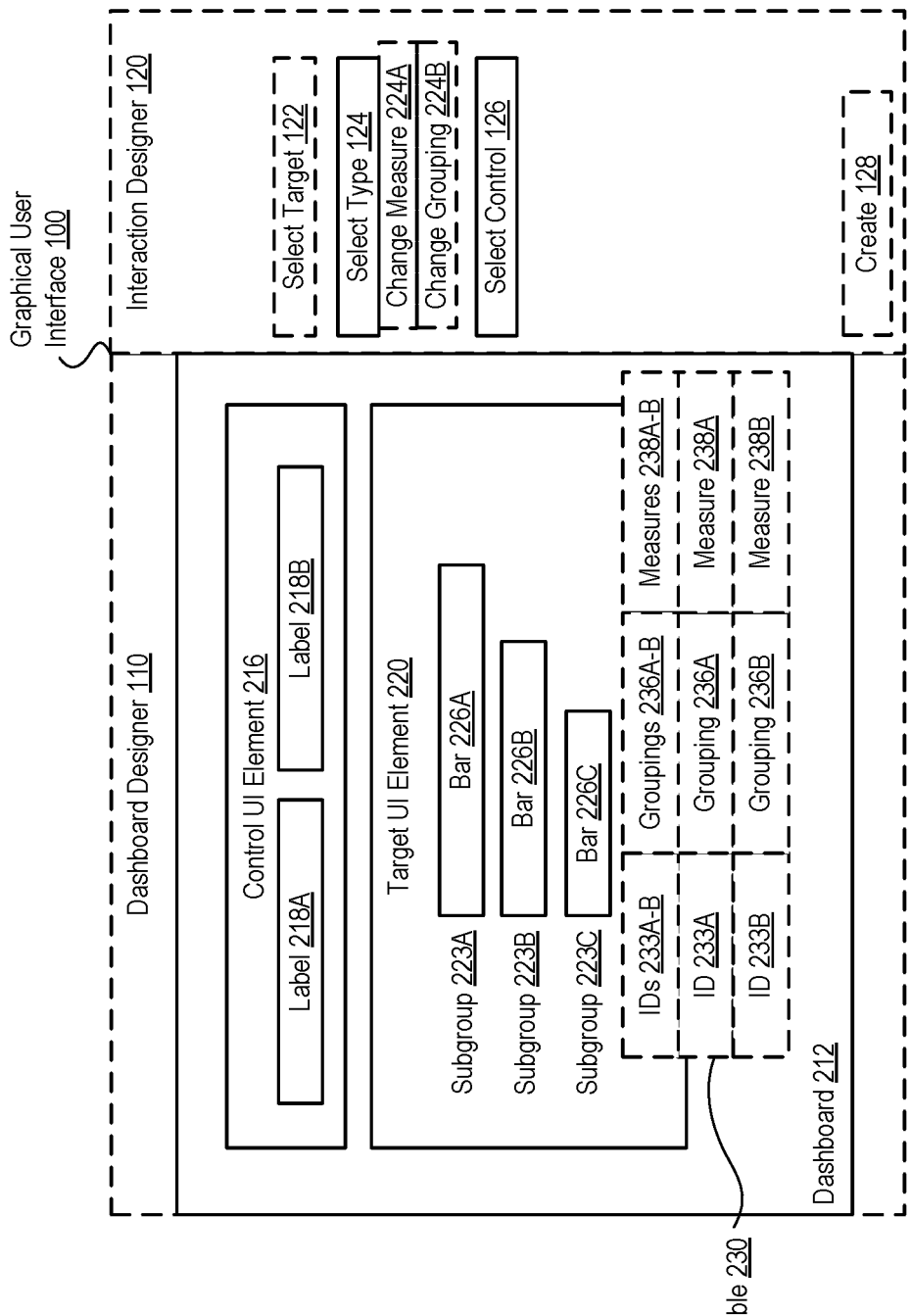
FIG. 2A is a diagram illustrating an exemplary GUI and dashboard including a control UI element, a target UI element, and a table that allows a user to view properties of the target UI element to be updated, according to some example implementations.

FIG. 2A is a diagram illustrating an exemplary GUI and dashboard including a control UI element, a target UI element, and a table that allows a user to view properties of the target UI element to be updated, according to some example implementations.

Specifically, FIG. 2A shows in dashboard 212 1) a control UI element 216 that has label 218A and label 218B, and 2) a target UI element 220 that is a visualization (namely, a bar graph). The target UI element 220 displays bar 226A, bar 226B, and bar 226C respectively corresponding to subgroup 223A, subgroup 223B, and subgroup 223C. For a more specific example (not shown), target UI element 220 may display revenue per region, where bar 226A, bar 226B, and bar 226C respectively correspond to revenue in regions corresponding to subgroup 223A, subgroup 223B, and subgroup 223C.

Dashboard 212 also shows the optional display of table 230. Table 230 has columns corresponding to 1) IDs 233A-B; 2) groupings 236A-B; and 3) measures 238A-B. In some implementations, table 230 is associated with the control UI element 216. Specifically, in table 230, IDs 233A-B may be associated with possible selections of the control UI element 216 such that selections of the control UI element 216 triggers selections between ID 233A (e.g., as a first identifier) and ID 233B (e.g., as a second identifier). These IDs can then identify mappings of values for one or more properties, shown in FIG. 2A as rows in table 230. For example, ID 233A and ID 233B can each identify a value for a grouping property and/or a value for a measure property of a target UI element (e.g., target UI element 220). In FIG. 2A, ID 233A can identify a value for grouping 236A and/or a value for measure 238A; ID 233B can identify a value for grouping 236B and/or a value for measure 238B. For example, ID 233A may correspond to an identifier "Revenue"; grouping 236A may correspond to a grouping of regions (corresponding to subgroup 223A, subgroup 223B, and subgroup 223C); and measure 238A may correspond to revenue figures (corresponding to figures shown by bar 226A, bar 226B, and bar 226C for the regions respectively corresponding to subgroup 223A, subgroup 223B, and subgroup 223C). In contrast, ID 233B may correspond to an identifier "Profit Margin"; grouping 236B may correspond to the grouping of regions; and measure 238B may correspond to profit margin figures (not shown). Label 218A and label 218B may respectively correspond to the text "Revenue" and "Profit Margin" to which ID 233A and ID 233B respectively correspond. In some implementations, triggering of the control UI element (e.g., control UI element 216) includes the selection between the labels (e.g., label 218A and label 218B) associated with the first and second identifiers (e.g., ID 233A and ID 233B).

Displaying a table such as table 230 helps a user to visualize one or more identifiers (corresponding to values in the first column of the table) that are each associated with one or more values (corresponding to one or more rows of the table) of one or more properties (corresponding to one or more columns of the table). Moreover, displaying a table such as table 230 may help a user to visually associate values of properties to 1) corresponding states of the control UI element; and/or 2) corresponding states of the target UI element. This association is further assisted by displaying a table such that a user can simultaneously view the table and one or both of the selected (or to be selected) control and target UI elements. For example, FIG. 2A shows GUI 100 displaying the table 230 such that the table 230, target UI element 220, and control UI element 216 can be viewed simultaneously. This allows a user creating an interaction using target UI element 220 and control UI element 216 to better visualize the relationships amongst these elements and the interaction being created. In turn, creating the interaction may be simpler. In some implementations, a table may be implemented in a floating (and optionally dockable) window. The position of the table may initially be such that the user can simultaneously view the table and 1) one or both of the control UI element and the target UI element, if selected; and/or 2) one or more other UI elements in the dashboard. The user may later reposition the table in the GUI 100 according to the user's preferences. Other implementations may implement the table in other ways.

Using a table such as table 230 associated with a control UI element may also further potential improvements discussed earlier regarding FIGS. 1A and 1B. For example, using a table may facilitate verifying that the control UI element includes mappings of values for the properties indicated by the type of interaction. Using a table also facilitates creating richer interactions. For example, using table 230 helps a user to select more than one property of a target UI element to be updated as described in more detail herein; e.g., by selecting more than one column of the table. Thus, referring to FIG. 2A, a user could create a type of interaction that indicates both a measure and a grouping of the target UI element 220 to be updated (not shown), rather than a type of interaction that indicates only a measure (cf. change measure 224A) or only a grouping (cf. change grouping 224B) to be updated.

FIG. 2A also shows, in the optional interaction designer 120, exemplary types of interactions designated by "Change Measure 224A" and by "Change Grouping 224B". The type of interaction designated by Change Measure 224A indicates a measure property (of a given target UI element) whose values are to be updated. The type of interaction designated by Change Grouping 224B indicates a grouping property (of a given target UI element) whose values are to be updated. For purposes of example, Change Measure 224A and Change Grouping 224B are shown directly below the UI element designated as "Select Type 124". Thus, Select Type 124 may be implemented as a dropdown with Change Measure 224A and Change Grouping 224B implemented as items in that dropdown. One of skill in the art will recognize that such an implementation is exemplary and not limiting, and that Select Type 124, Change Measure 224A, and/or Change Grouping 224B may be implemented in other ways and/or in other arrangements. In some implementations, Change Measure 224A and Change Grouping 224B may have been suggested to the user based on the selection of target UI element 220 (as the target UI element); e.g., because target UI element 220 has a measure property and a grouping property.

Implementations may implement differently the UI elements designated as Select Target 122, Select Type 124, Select Control 126, and/or Create 128. For example, Select Target 122, if implemented, may be implemented as a combo box (also referred to as a dropdown) that, when selected, displays in the combo box the displayed elements 114. Alternatively, Select Target 122 may be implemented as a button that, when selected, allows a user to select a target UI element with a mouse-click, voice command, or gesture. One of skill in the art will recognize that Select Target 122 may be implemented in other ways. In some implementations, Select Target 122 is not implemented. In those implementations, a user may select a target UI element in other ways; e.g., with a mouse-click (e.g., right-clicking the mouse on the target UI element to display a context menu that allows selection of that element) or a voice command (e.g., to designate a particular UI element as a target UI element).

Similarly, Select Control 126 is implemented in some implementations as a combo box, a searchable combo box, etc. Alternatively, Select Control 126 may be implemented as a button that, when selected, allows a user to select a target UI element with a mouse-click or voice command Select Control 126 may allow for selection of one of displayed elements 114 as a control UI element. However, Select Control 126 may allow for selection from other UI elements; e.g., commonly used UI elements (e.g., based on historical use of such elements, or based on current use in other dashboards), UI elements corresponding to UI element definitions 132A-N, if implemented, UI elements which can be created from a palette of model UI elements, etc.

In other implementations, a user could perform other actions to select a control UI element, potentially together with the target UI element. For example, a user could select a UI element with a mouse-click (e.g., using the left mouse button) and select another UI element with another mouse-click (e.g., using the left mouse button), then with yet another mouse-click (e.g., using the right mouse button), display a context menu that allows the user to select the UI elements respectively as a target and as a control UI element. Alternatively, a user could launch a wizard that prompts the user to select the target UI element, the control UI element, and the type of interaction in sequence (including by selecting UI elements in the dashboard). One of skill in the art will recognize that other ways are possible to select one or more of the control and target UI elements.

Implementations described herein include a GUI displaying UI elements and a user making selections with those UI elements to create an interaction. One of skill in the art will recognize however that implementations may also support an API for programmatically creating interactions. A computer program may make selections (e.g., of UI elements, of a type of interaction, etc.) using such an API. For example, a computer program could select a UI element as a target UI element by calling a corresponding API endpoint, function, or method with a parameter that indicates the target UI element. Also, a computer program may make selections by simulating a user of the GUI making selections (e.g., by simulating mouse-clicks, keypresses, gestures, and/or voice commands, etc.).

Figure 2B:
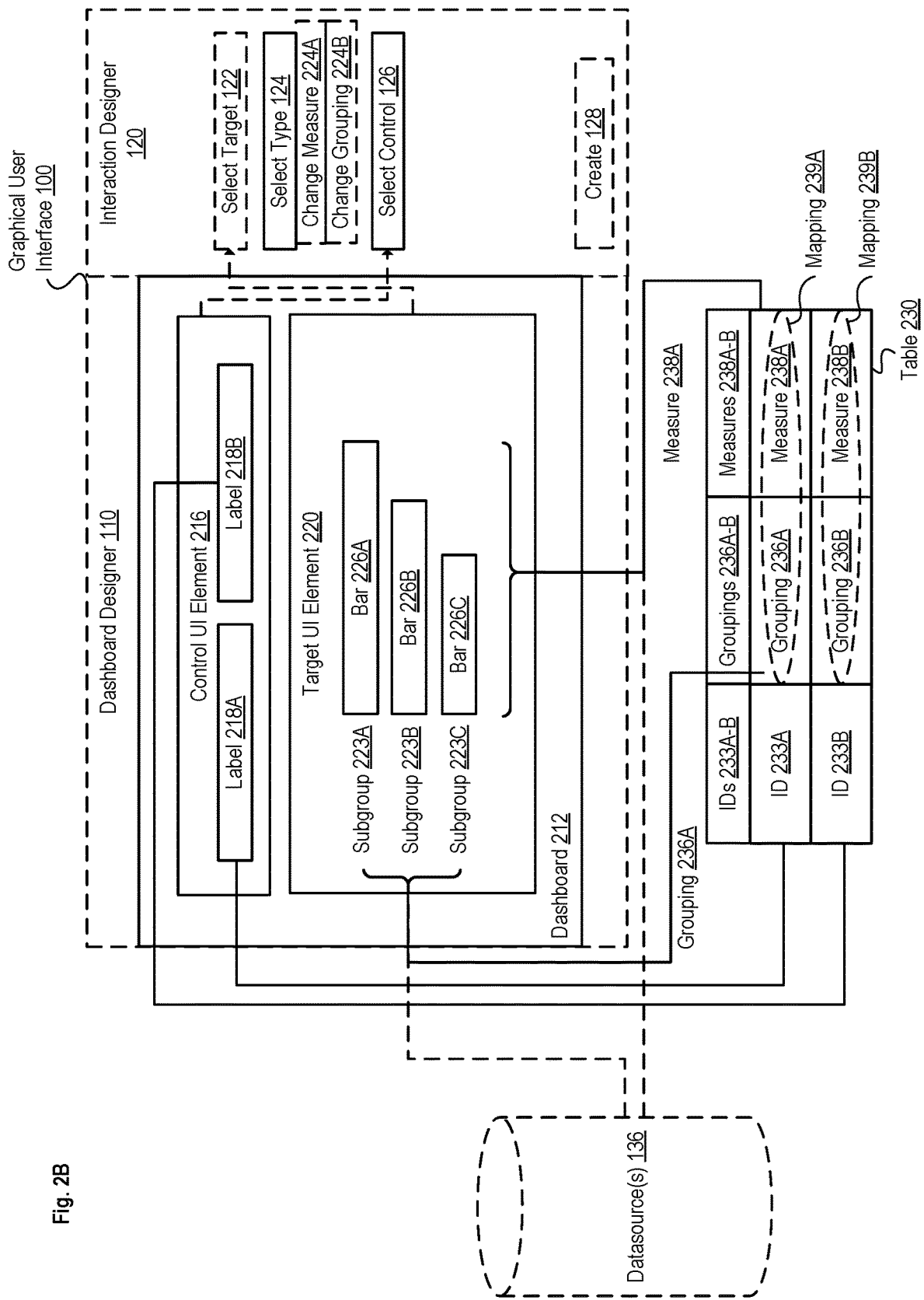
FIG. 2B is a diagram illustrating functional relationships between a control UI element, a target UI element, and a table in the context of exemplary types of interactions, according to some example implementations.

FIG. 2B is a diagram illustrating functional relationships between a control UI element, a target UI element, and a table in the context of exemplary types of interactions, according to some example implementations. Like FIG. 2A, FIG. 2B shows dashboard 212, optional interaction designer 120, and optional dashboard designer 110 in GUI 100. FIG. 2B also shows table 230. However, a mapping 239A and a mapping 239B are indicated in the table 230 shown in FIG. 2B. ID 233A identifies mapping 239A, which includes grouping 236A and measure 238A; ID 233B identifies mapping 239B, which includes grouping 236B and measure 238B. One of skill in the art will recognize that the elements 233A, 233B, 236A, 236B, 239A, and 239B are displayed close to each other in table 230 but need not be stored together (if at all).

Target UI element 220 is displayed based on measure 238A and grouping 236A; i.e., the values corresponding to a first mapping, mapping 239A. Thus, data displayed by bar 226A, bar 226B, and bar 226C in target UI element 220 corresponds to measure 238A grouped by grouping 236A (corresponding to at least subgroup 223A, subgroup 223B, and subgroup 223C). Optional datasource(s) 136 are associated with measure 238A and grouping 236A as shown by dashed lines between datasource(s) 136 and respectively 1) a bracket indicating bar 226A, bar 226B, and bar 226C, and 2) a bracket indicating subgroup 223A, subgroup 223B, and subgroup 223C. Datasource(s) 136 may also be associated with measure 238B and grouping 236B (association(s) not shown). For example, datasource(s) 136 may include one or more database objects; target UI element 220 may be based on data in a first plurality of fields of records of those database objects (corresponding to measure 238A grouped by grouping 236A).

Label 218A is associated with ID 233A as indicated by the solid line between label 218A and ID 233A. Also, label 218B is associated with ID 233B as indicated by the solid line between label 218B and ID 233B. In some implementations, the control UI element displays one or more of IDs 233A-B or text associated with those IDs; e.g., label 218A may be text associated with ID 233A and/or label 218B may be text associated with ID 233B. Displaying labels, IDs, or associated text may be advantageous compared to displaying a textual representation of the mapping of values; the labels may be more intuitive for dashboard users, especially when a type of interaction (and thus, mapping of values) involves multiple properties. In some implementations, ID 233A identifies mapping 239A and ID 233B identifies mapping 239B. Thus, in the context of performing an interaction involving control UI element 216 and target UI element 220, values of mapping 239B will be used to update one or both of the measure and grouping properties responsive to selection of label 218B in control UI element 216.

For example, if the type of the interaction indicated a measure property (e.g., via selection of Change Measure 224A when creating the interaction), then performing the interaction will include updating the measure property of target UI element 220 with the value corresponding to measure 238B in mapping 239B. If the type of the interaction indicated a grouping property (e.g., via selection of Change Grouping 224B when creating the interaction), then performing the interaction will include updating the grouping property of target UI element 220 with the value corresponding to grouping 236B in mapping 239B. If the type of interaction indicated a grouping property and a measure property, then performing the interaction would include updating both the grouping and the measure property as described.

Updating the measure property may result in the lengths of one or more of bar 226A, bar 226B, and bar 226C changing to reflect the updated measure. Updating the grouping property may result in one or more labels associated with subgroup 223A, subgroup 223B, and subgroup 223C changing to reflect the updated grouping. Updating the grouping may also result in the lengths of one or more of bar 226A, bar 226B, and bar 226C changing to reflect the updated grouping because the measure displayed by those bars will be relative to the updated grouping. In some implementations, updating the measure property may also result in one or more labels associated with subgroup 223A, subgroup 223B, and subgroup 223C changing to reflect the updated measure. For example, target UI element 220 may be configured such that it displays the top three measures by grouping. When the measure property is updated, the subgroups corresponding to the top three measures may change; e.g., the top three regions (grouping) for revenue (measure) may be region A, region B, and region C, however the top three regions for profit margin (updated measure) may be region B, region E, and region A.

If optional datasource(s) 136 are associated with measure 238B and grouping 236B (association(s) not shown), performing the interaction may include 1) retrieving data associated with corresponding values for measure 238B and/or grouping 236B from datasource(s) 136 and/or 2) refreshing target UI element 220 with that data. For example, after performing the interaction, target UI element 220 may be based on data in a second plurality of fields of records of database objects, where that second plurality is different from the first plurality mentioned previously. Refresh and refreshing means, in the context of a displayed UI element, displaying the element such that it is up to date (e.g., such that a visualization displays up-to-date data; such that a UI element with a changed property value is displayed with the changed value of that property, etc.).

Notably, if the target UI element is based on data in one or more datasource(s) 136, creating an interaction may involve certain assumptions regarding the contents and/or structure of the datasource(s) 136. Returning to a similar example to that discussed in relation to FIG. 2A, measure 238A may correspond to revenue figures, grouping 236A may correspond to a grouping of geographical regions, measure 238B may correspond to profit margin figures, and grouping 236B may correspond to the grouping of product lines. In this example, target UI element 220 is initially displayed based on revenue figures grouped by geographical region. If the type of interaction indicates the measure property, then performing the interaction would include updating the measure property with the value of measure 238B. Thus, target UI element 220 would be based on profit margin figures (corresponding to measure 238B) grouped by geographical region (corresponding to grouping 236A). If the type of interaction indicates the grouping property, then performing the interaction would include updating the grouping property with the value of grouping 236B. Thus, target UI element 220 would be based on revenue figures (corresponding to measure 238A) grouped by product lines (corresponding to grouping 236B). If the type of interaction indicates the measure and the grouping property, then performing the interaction would include updating the measure property with the value of measure 238B and the grouping property with the value of grouping 236B. Thus, target UI element 220 would be based on profit margin figures (corresponding to measure 238B) grouped by product lines (corresponding to grouping 236B). Thus, these types of interactions respectively involve: 1) revenue figures grouped by geographical region, 2) profit margin figures grouped by geographical region, 3) revenue figures grouped by product line, and 4) profit margin figures grouped by product line.

Such assumptions regarding the content and/or structure of the datasource(s) 136 can be tested programmatically. When the target UI element and the type of interaction have been selected, the one or more properties indicated by the type of interaction can be verified. Verifying the properties can include verifying that the target UI element has those properties, as previously discussed. Additionally, the mappings of values for those properties can be validated. Validating the mappings of values can include identifying a set of datasource(s) referenced by the target UI element and, for the set, validating that at least one datasource supports each of the values of the mappings. Referring to FIG. 2B, validating the mappings of values could thus include validating that those of the datasource(s) 136 referenced by target UI element 220 support measure 238A (e.g., revenue), measure 238B (e.g., profit margin), grouping 236A (e.g., geographical region), and grouping 236B (e.g., product line).

Verifying the properties and/or validating the mappings of values could occur at one or more times. For example, verifying and/or validating could occur around the time that the interaction is created to provide feedback to the user at that time; e.g., verifying and/or validating could occur when trigger 153 is fired and/or when both a selection for the type of interaction and a selection for the target UI element are accepted (e.g., after execution of block 149 and block 140). Additionally or alternatively, verifying and/or validating could occur around the time that the interaction is performed to avoid errors when performing the interaction; e.g., verifying and/or validating could occur when a dashboard that includes the interaction is loaded and/or displayed, when the interaction is performed, and/or when any datasource(s) 136 are accessed. If those of the datasource(s) 136 referenced by target UI element 220 do not support the type(s) of interactions or mappings of values, an error message could be displayed. Additionally or alternatively, suggestions for other type(s) of interactions, mappings of values, and/or changes to the datasource(s) 136 could be made.

Regardless whether the target UI element is based on data in one or more datasource(s) 136, some implementations may perform sanity checking before or after firing trigger 153 (regardless whether Create 128 is implemented). For example, implementations may check that each of a target UI element, a control UI element, and a type of interaction have been selected; that the type of interaction is supported by or available for the selected target UI element; that the selected control UI element is associated with values for the one or more properties indicated by the type of interaction, etc. In other implementations, sanity checks (if any) may depend on what has been stored in the definition for the interaction. For example, implementations may incrementally store identifiers for the target and control UI elements and the type of interaction in the definition for the interaction (e.g., an identifier may be stored in the definition after a selection, then the definition updated with another identifier after another selection, etc.). In such implementations, some sanity checks may be performed based on the information stored in the definition for the interaction, while other sanity checks may be postponed.

FIG. 2C is a more detailed flow diagram illustrating an exemplary way for a user creating an interaction to view the set of properties to be updated, according to some example implementations. Block 140, block 145, block 149, block 150, block 152, block 155, and block 160 have already been described. In optional block 257, a third UI element of the GUI is displayed. The third UI element allows the user to view the set of properties to be updated. The third UI element may comprise a table. For example, in optional block 259, a table is displayed. The table includes rows and columns, the columns including one or more columns each corresponding to a different property of the set of properties, and the rows including first and second rows. The first row includes a first identifier and a first mapping of values; the second row includes a second identifier and a second mapping of values. From block 140, block 149, block 152, and block 257 (if implemented), flow passes to block 155.

As one of skill in the art will recognize, designation of a row of the table as "first" or "second" does not necessarily imply that the row is respectively the first or the second row of the table (e.g., as counted from the top-most or bottom-most row of the table), or any particular location amongst the rows of the table. In optional block 160, the control UI element and the target UI element based on values corresponding to the first mapping of values are displayed. Determining a first mapping of values can occur in different ways. For example, the control UI element may have a default value or state (e.g., a toggle may have a default toggle state; a group of radio buttons may have a default selection of those buttons, etc.). That default value or state may identify, directly or indirectly, a mapping of values as the first mapping of values. Alternatively, the first mapping of values may be determined as that corresponding to the initial state of the target UI element; i.e., the first mapping is that which corresponds to the values of the properties of the target UI element before the interaction is created (if such a mapping exists). For example, with reference to FIG. 2B, the first mapping may be mapping 239A because target UI element 220 reflects the measure 238A and the grouping 236A included in mapping 239A. Alternatively, the first mapping could be that which is included in the first row of the table (e.g., as counted from the top-most or bottom-most row of the table). In such implementations, a user may be able to specify the order of rows of the table. In other implementations, a row in the table could indicate an ordinal for the mapping included in that row. The first mapping of values could also be determined with reference to other UI elements in the dashboard. For example, consider a type of interaction that indicates a property of a UI element relating to color. The first mapping of values may be determined with reference to one or more values of the color properties of other UI elements (e.g., to provide uniformity or contrast between the target UI element and those other UI elements, to provide a common look-and-feel, to correspond to changes in dashboard or GUI settings, etc.).

Figure 2D:
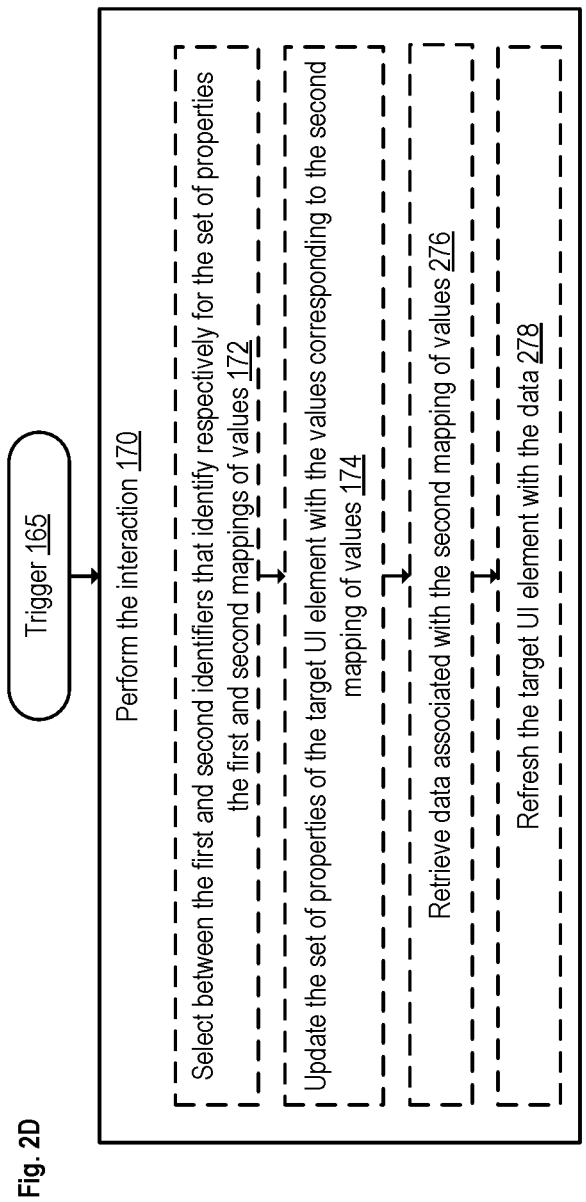
FIG. 2D is a more detailed flow diagram illustrating an exemplary way for an interaction to be performed responsive to a trigger.

FIG. 2D is a more detailed flow diagram illustrating an exemplary way for an interaction to be performed responsive to a trigger. Trigger 165, block 170, block 172, and block 174 have been described with reference to FIG. 1C. As shown in FIG. 2D, block 170 optionally includes block 276 and block 278. In block 276, data associated with the second mapping of values is retrieved. For example, referring to FIG. 2B, performing the interaction may include retrieving data associated with the mapping 239B from datasource(s) 136. As discussed previously, retrieving the data may include retrieving data in a second plurality of fields of records of database objects in datasource(s) 136, where those fields, records, and/or database objects differ from those associated with the first mapping of values. From optional block 276, flow passes to optional block 278. In block 278, the target UI element is refreshed with the data retrieved in block 276. Returning to the example from FIG. 2B, target UI element 220 is refreshed with the data corresponding to mapping 239B; i.e., data associated with one or both of grouping 236B and measure 238B.

Selecting Properties

Figure 3A:
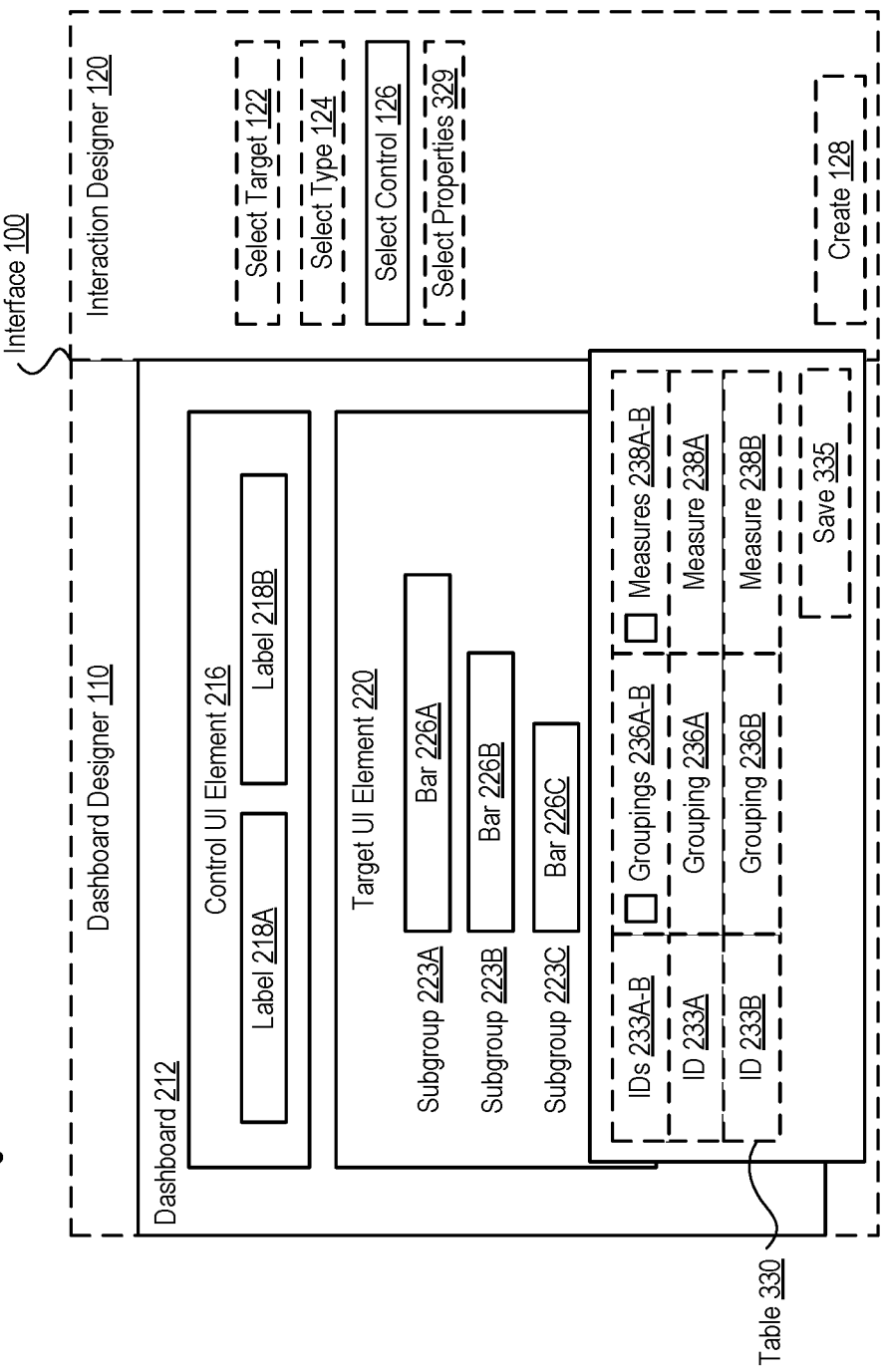
FIG. 3A is a diagram illustrating an exemplary GUI and dashboard including a control UI element, a target UI element, and a table that allows a user to select properties of the target UI element to be updated, according to some example implementations.

FIG. 3A is a diagram illustrating an exemplary GUI and dashboard including a control UI element, a target UI element, and a table that allows a user to select properties of the target UI element to be updated, according to some example implementations. In contrast with the optional interaction designer 120 shown in FIG. 2A, interaction designer 120 shown in FIG. 3A includes a UI element of the GUI designated as "Select Properties 329". This UI element allows a user to select the set of properties to be updated as part of the interaction being created; e.g., via the UI element which includes table 330.

Like table 230 of FIG. 2A, table 330 has IDs 233A-B, groupings 236A-B, and measures 238A-B. In contrast to table 230, table 330 also includes an exemplary checkbox to the left of the label "Groupings 236A-B" and another exemplary checkbox to the left of the label "Measures 238A-B". Each of the two checkboxes allows a user to select the corresponding column of table 330. For example, a user could select one or both checkboxes to select one or both of the columns designated as Groupings 236A-B and Measures 238A-B. One of skill in the art will recognize that other ways of selecting columns in the table could be envisaged (e.g., one or more columns could be selected using mouse-clicks or keypresses and indicate selection using highlighting). Notably, if a selection of a type of interaction has been accepted before table 330 is displayed, the one or more properties indicated by the type of interaction can be pre-selected in table 330. For example, with reference to FIG. 2B, a user could select a type of interaction which indicates a measure property to be updated (e.g., by selecting the UI element designated by Change Measure 224A). If selection of that type of interaction is accepted before table 330 is displayed, table 330 could be displayed with the column designated as Measures 238A-B pre-selected. When the user has selected one or more columns of table 330 as one or more properties of the set of properties to be updated, the user can select the UI element designated as Save 335. Responsive to the user selecting that UI element, the user's selection of the set of properties to be updated are accepted.

Accepting from the user a selection of the set of properties to be updated in this way may also comprise accepting from the user a selection of a type of interaction. Thus, the UI element designated as Select Type 124 is optional in some implementations such as those depicted in FIG. 3A. Other configurations of Select Type 124 and Select Properties 329 are possible, however. For example, Select Type 124 may allow a user to select a type of interaction, wherein the type of interaction identifies one or more properties to be updated. Select Properties 329 may then allow the user to customize the user's selection of properties (e.g., by selecting one or more additional properties, and/or de-selecting one or more properties that were selected because the type of interaction identifies them).

Additionally or alternatively, a UI element such as Select Properties 329 may allow a user to create a table such as table 330. In such implementations, selecting the UI element displays a window or other UI area to allow for creating a table. The window may include an empty table, UI elements that allow for adding a column, adding a row, removing a column, and removing a row. The window may also allow for entering and/or selecting one or more values in a mapping of values in a row. For example, a value for a label property may be entered using keyboard input; a value for a color property may be entered and/or selected using a color picker; a value for a property associated with data (e.g., a measure or a grouping) may be entered and/or selected using a searchable dropdown which shows possible values in one or more available datasources. In other implementations, the window or other UI area to allow for creating a table may be pre-populated with a table created by default. The default table may include default identifiers (e.g., based on elements of the control UI element, if selected (e.g., labels)) and/or default mappings of values (e.g., based on values of the target UI element's properties, if the target UI element is selected, and/or values of the one or more properties indicated by the type of interaction, if selected). When the user has selected the rows and columns for the table (including identifiers and mappings of values, as appropriate), the user can save the table for later use.

Figure 3B:
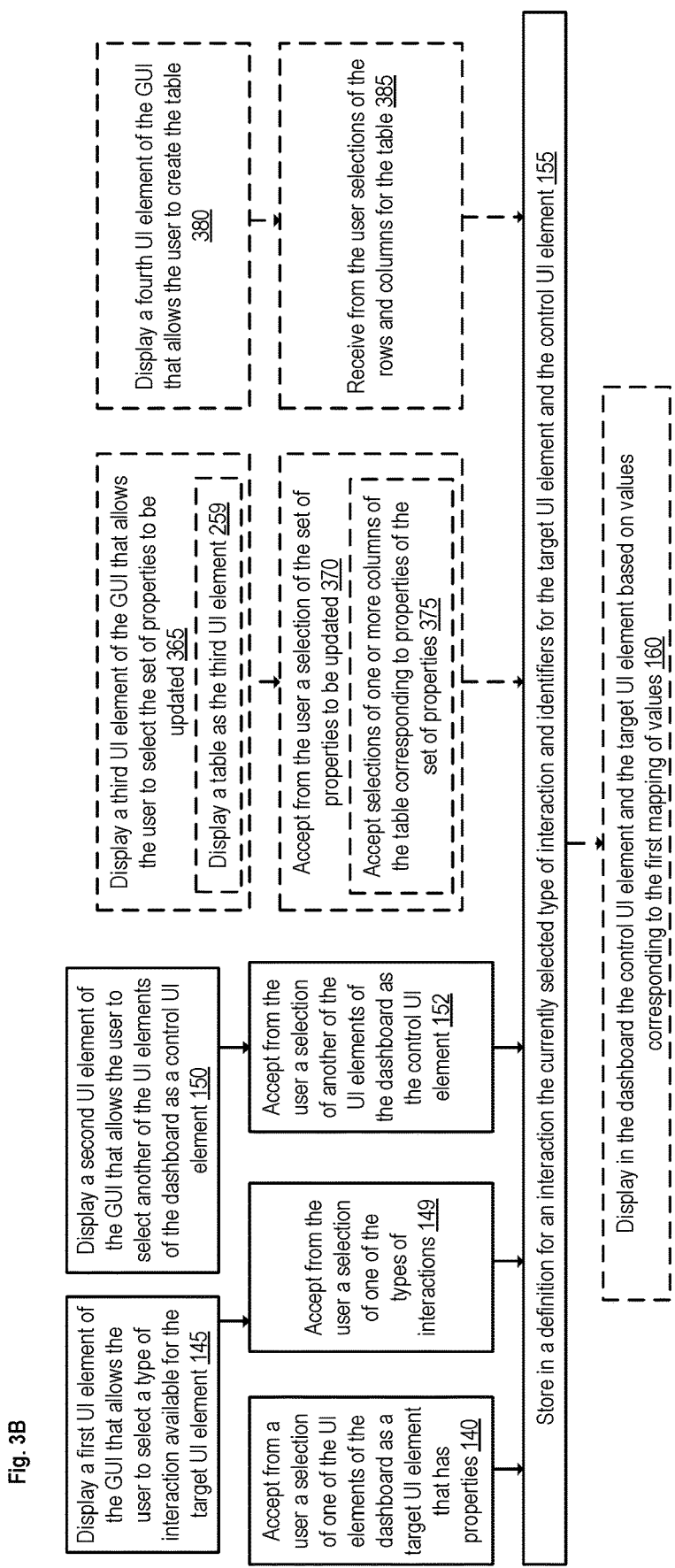
FIG. 3B is a more detailed flow diagram illustrating an exemplary way for a user creating an interaction to select the set of properties to be updated, according to some example implementations.

FIG. 3B is a more detailed flow diagram illustrating an exemplary way for a user creating an interaction to select the set of properties to be updated, according to some example implementations. Block 140, block 145, block 149, block 150, block 152, block 155, and block 160 have been discussed elsewhere. In contrast with block 257 in FIG. 2C, in optional block 365, a third UI element of the GUI is displayed that allows the user to select the set of properties to be updated. Like block 257, block 365 optionally includes block 259 which is described in relation to FIG. 2C. From block 365, flow passes to block 370.

In block 370, a selection of the set of properties to be updated is accepted from the user. Block 370 optionally includes block 375. In block 375, selections of one or more columns of the table corresponding to properties of the set of properties are accepted.

In block 380, a fourth element of the GUI is displayed that allows the user to create the table. From block 380, flow passes to optional block 385.

In optional block 385, selections of the rows and columns for the table are received from the user. As one of skill in the art will recognize, a single UI element of the GUI can act as both the third UI element referenced in block 365 (i.e., the element that allows the user to select the set of properties to be updated) and the fourth UI element referenced in block 380 (i.e., the element that allows the user to create the table). A single UI element of the GUI can also allow a user to both view the set of properties to be updated (per block 257 of FIG. 2C) and select the set of properties to be updated (per block 365). Additionally or alternatively, selections of the columns for the table, per block 385, may also comprise selections corresponding to properties of the set of properties, per block 375.

From block 140, block 149, block 152, block 370 (if implemented), and block 385 (if implemented), flow passes to block 155.

As one of skill in the art will recognize, allowing a user to create a table and/or use a table to select properties of the target UI element to be updated provides several advantages. Creating a table as part of creating the interaction allows the user to specify the identifiers and mappings of values in the table in the context of creating the interaction, rather than before it. Creating a table before creating the interaction may risk the user discovering when creating the interaction that editing the table is needed or desirable. Thus, the user can potentially avoid having to later edit the table by creating a table as part of creating the interaction. Using a table to select properties allows a user to customize a selected type of interaction (e.g., by selecting or deselecting one or more properties of the selected type of interaction). Alternatively, if a user has not yet selected a type of interaction, it can be selected by the user selecting one or more columns of the table. Thus, the table can be used as an alternative way of selecting the type of interaction. Creating and/or using the table thus provides several advantages, some of which are described in more detail with reference to previous figures (e.g., FIG. 1A, FIG. 1B, etc.).

Figure 3C:
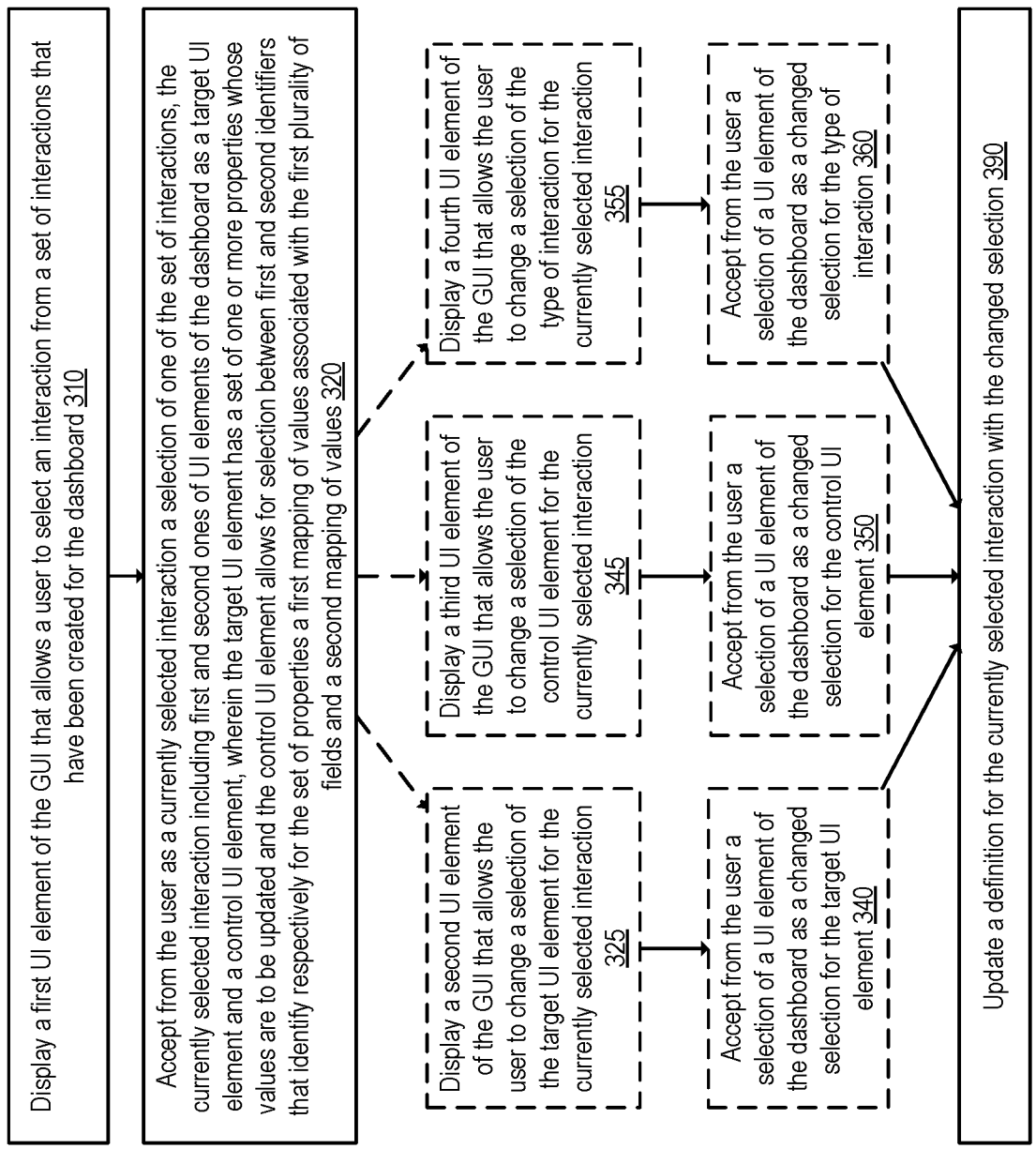
FIG. 3C is a flow diagram illustrating an exemplary way for a user designing a dashboard to make selections rather than coding to edit an interaction that has been created, according to some example implementations.

FIG. 3C is a flow diagram illustrating an exemplary way for a user designing a dashboard to make selections rather than coding to edit an interaction that has been created, according to some example implementations.

In block 310, a first UI element of the GUI is displayed. The first UI element allows a user to select an interaction from a set of interactions that have been created for the dashboard. The interactions that have been created may be displayed in different ways. For example, with reference to FIG. 3A, interaction designer 120 may include a tab (not shown) which displays for a currently selected dashboard any interaction(s) that have been created for that dashboard (e.g., the tab may display a list of interactions, one or more of which are selectable and optionally identified by target UI element, control UI element, type of interaction, label, and/or descriptive text, etc.). The interactions (if any) that have been created for a dashboard may be determined in different ways. For example, with reference to FIG. 1A, metadata repository 130 (if implemented) may be used to determine any created interactions for the currently selected dashboard; e.g., any interaction definitions 138A-K associated with dashboard definition 134A can be identified. Alternatively, in implementations where definitions for interactions are stored in the corresponding dashboard(s), dashboard 112 may be searched for interactions. From block 310, flow passes to block 320.

In block 320, a selection from one of the set of interactions is accepted as a currently selected interaction. The currently selected interaction may include one or more of 1) a type of interaction, 2) a target UI element (and/or identifier therefor), and/or 3) a control UI element (and/or identifier therefor). The currently selected interaction may have less than all of these items (e.g., the currently selected interaction may include first and second UI elements of the dashboard as a target UI element and a control UI element). For example, in some implementations, as previously discussed, trigger 153 may be fired one or more times on accepting a user's selections of one or more of these items. Thus, such implementations may store in a definition for the interaction only one or more of these items. In other implementations, a type of interaction may be inferred as previously discussed. From block 320, flow passes to one or more of block 325, block 345, and/or block 355.

In block 325, a second UI element of the GUI is displayed. The second UI element allows a user to change a selection of the target UI element for the currently selected interaction. With reference to FIG. 3A, the second UI element may be an element designed as Select Target 122. Select Target 122 has been discussed previously herein. From block 325, flow passes to block 340.

In block 340, a selection of a UI element of the dashboard is accepted from the user as a changed selection for the target UI element.

In block 345, a third UI element of the GUI is displayed. The third UI element allows a user to change a selection of the control UI element for the currently selected interaction. With reference to FIG. 3A, the third UI element may be an element designed as Select Control 126. Select Control 126 has been discussed previously herein. From block 345, flow passes to block 350.

In block 350, a selection of a UI element of the dashboard is accepted from the user as a changed selection for the control UI element.

In block 355, a fourth UI element of the GUI is displayed. The fourth UI element allows a user to change a selection of the type of interaction for the currently selected interaction. With reference to FIG. 3A, the fourth UI element may be an element designed as Select Type 124 or Select Properties 329. Select Type 124 and Select Properties 329 have been discussed previously herein. From block 355, flow passes to block 360.

In block 360, a selection of a UI element of the dashboard is accepted from the user as a changed selection for the type of interaction.

Implementations may implement one or more of block 325, block 345 and/or block 355 (and additionally, one or more of block 340, block 350 and/or block 360 respectively). For example, some implementations may wish to restrict how a user can edit an interaction. Moreover, in other implementations, functionality provided by one or more block may already be provided; e.g., implementations which support block 365 and block 370 shown in FIG. 3B already allow a user to select the set of properties to be updated; thus, these blocks may effectively allow the user to change the type of interaction for the currently selected interaction, per block 355. From those of block 340, block 350, and block 360 that are implemented, flow passes to block 390.

In block 390, a definition for the currently selected interaction is updated with the changed selection. Updating the definition may include: 1) if the target and/or control UI elements are changed, storing identifiers for those elements in the definition, and/or 2) storing the changed type of interaction in the definition.

Code Generation for Implementing Interactions

Figure 4A:
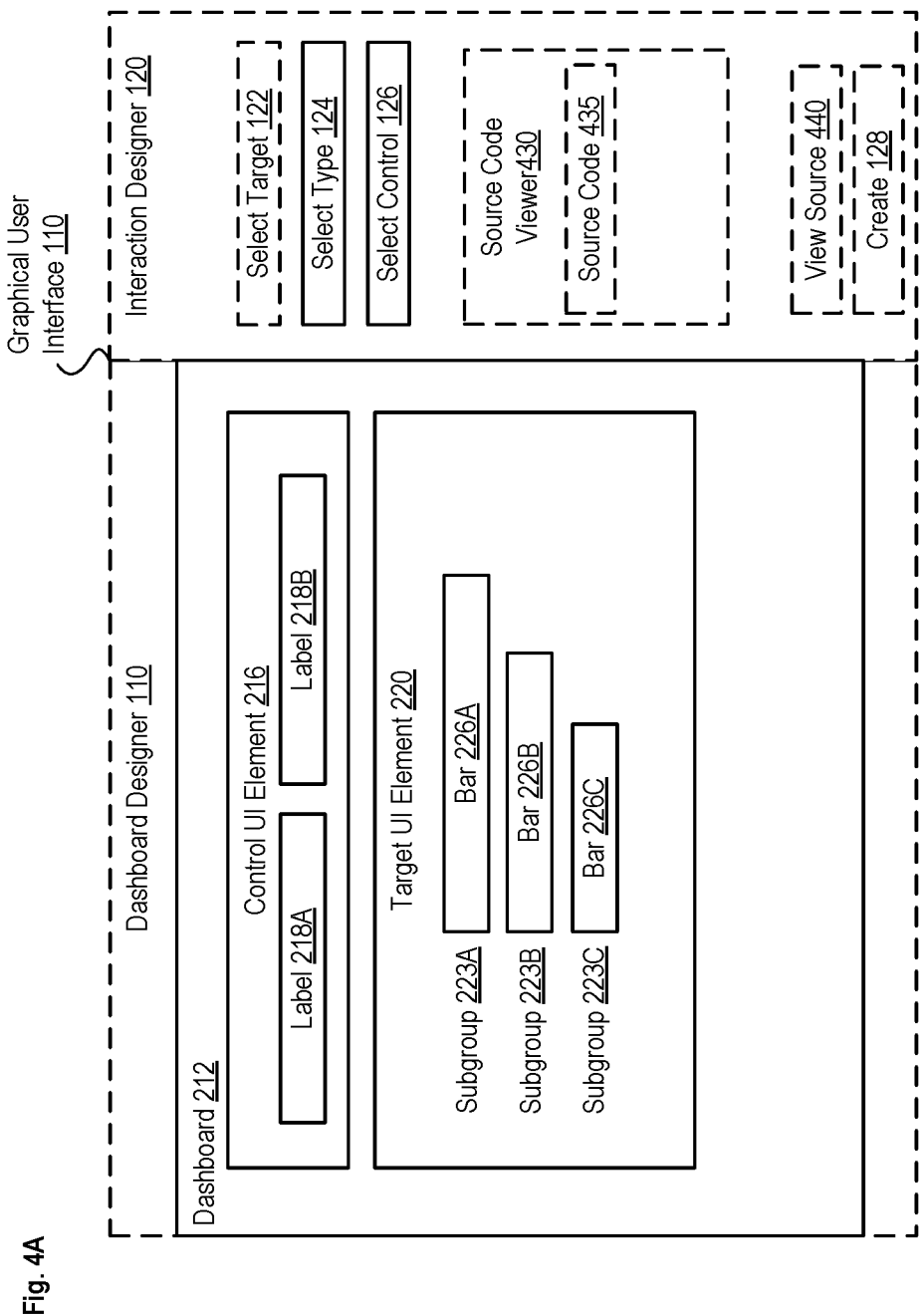
FIG. 4A is a diagram illustrating an exemplary GUI and dashboard including a control UI element, a target UI element, and code viewer functionality, according to some example implementations.

FIG. 4A is a diagram illustrating an exemplary GUI and dashboard including a control UI element, a target UI element, and code viewer functionality, according to some example implementations. In contrast with the optional interaction designer 120 shown in FIG. 2A, interaction designer 120 shown in FIG. 4A includes optional UI elements of the GUI designated as "Source Code Viewer 430" and "View Source 440". Source Code Viewer 430 optionally includes source code 435. Other elements in FIG. 4A are described herein with reference to other figures.

Figure 4B:
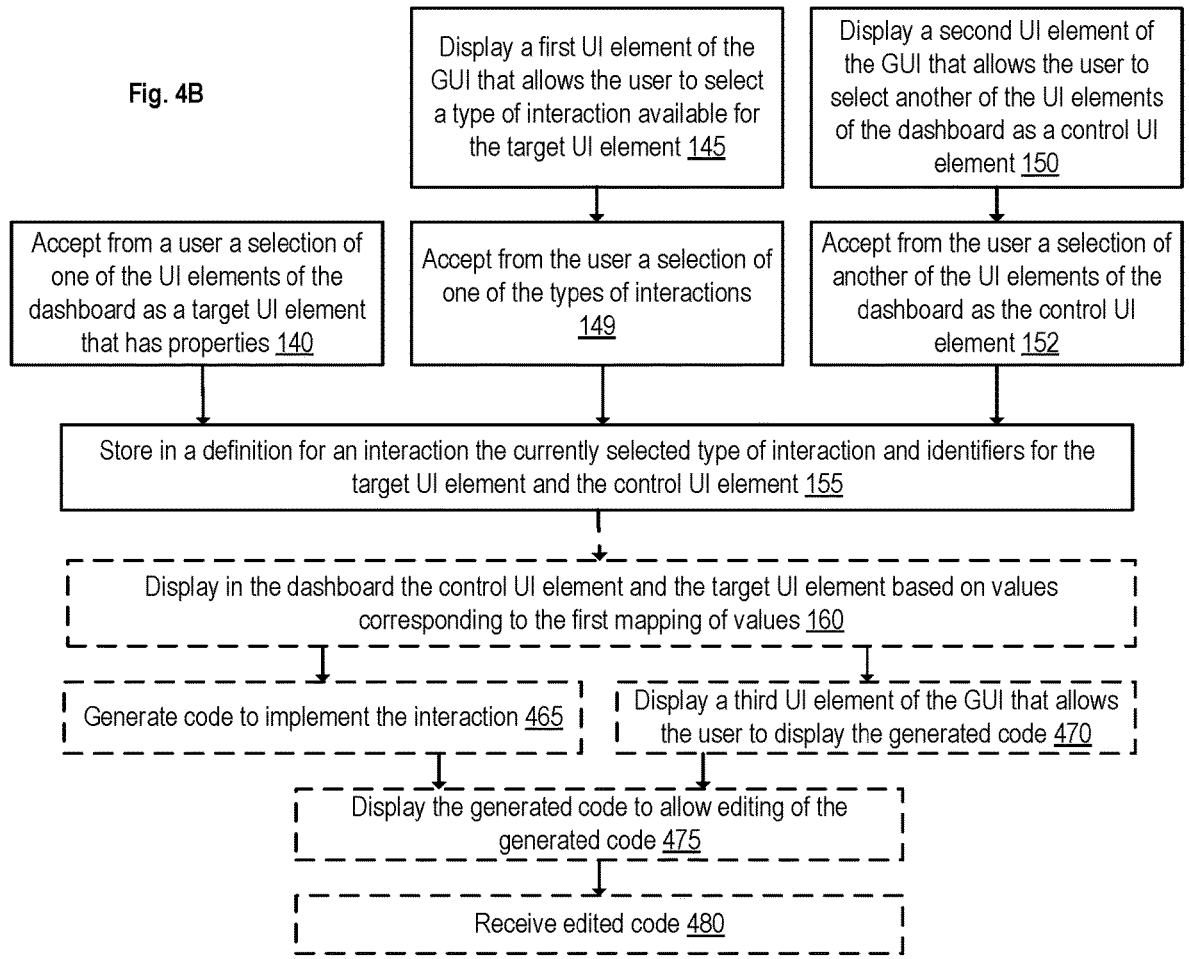
FIG. 4B is a flow diagram illustrating an exemplary way for a user designing a dashboard to make selections to create an interaction using generated code, according to some example implementations.

FIG. 4B is a flow diagram illustrating an exemplary way for a user designing a dashboard to make selections to create an interaction using generated code, according to some example implementations. Block 140, block 145, block 149, block 150, block 152, block 155, and block 160 are described elsewhere herein. In optional block 465, code is generated to implement the interaction. In some implementations, the generated code references the mappings of values and the identifiers for the target and control UI elements. In other implementations, the generated code may reference different information; e.g., identifiers for the target and control UI elements, identifiers for the mappings of values, and/or elements or datasources to provide those values.

Implementations may also allow for code to be generated at different times. In some implementations, code may be generated around the time when the definition for the interaction is stored. Optionally, the generated code is also stored (e.g., in or associated with the dashboard, the definition for the dashboard, and/or definition for the interaction). Such implementations may offer advantages; e.g., if performing the interaction includes executing the generated code, the interaction can be performed after the interaction is created. In other implementations, code may be generated when the control UI element of the interaction is triggered. Such implementations offer other advantages; e.g., the generated code need not be stored. Moreover, the generated code is less likely to be invalid due to intervening changes to the dashboard. In yet other implementations, code may be generated at some time between the interaction being created and the interaction being performed. These implementations may balance the respective advantages of generating code at those times. In determining the time when code is to be generated, the length of time to generate and otherwise prepare the code for execution is relevant. If generating code is relatively fast, code generation can be postponed closer to the time when the interaction is performed without risking relative slow performance of the interaction (because the code is generated around the time of performing the interaction). The nature of the GUI may also be relevant. For example, if the GUI is presented in a web browser and the generated code can be readily loaded in a web browser (e.g., the generated code is JavaScript or Hypertext Markup Language version 5 (HTML5)), preparing the code for execution may be relatively fast. In contrast, if the GUI is present in a native application and the generated code cannot be readily loaded in the native application (e.g., the generated code is Java which is compiled to bytecode and the bytecode loaded by a Java Virtual Machine), preparing the code for execution may be relatively slow.

In optional block 470, a third element of the GUI is displayed that allows the user to display the generated code. For example, referring to FIG. 4A, some implementations may include the optional UI element designated as "Source Code Viewer 430" or "View Source 440". Source Code Viewer 430 displays source code 435, which may include the generated code. Alternatively, selecting the UI element designated as View Source 440 may cause a separate GUI window (or other area) to be displayed, and generated source code displayed therein. One of skill in the art will recognize that other ways for allowing the user to display the generated code are possible (e.g., displaying a tab in the optional interaction designer 120, displaying a separate tab adjacent to the optional interaction designer 120, etc.).

The content of the generated code depends on various factors. In some implementations, the generated code includes code to perform one or more of block 172, block 174, block 276, block 278, and/or other operations. In some implementations, generated code is associated with an event handler for the control UI element. Responsive to triggering the control UI element, the event handler and thus the generated code is called. That generated code may call one or more functions or methods to, directly or indirectly, 1) select the identifier associated with the selection of the control UI element; 2) select the mapping of values identified by that identifier; 3) select the one or more values of those mappings to be used, based on the one or more properties indicated by the type of interaction; 4) update the set of properties of the target UI element with those values; 5) retrieve data associated with those values, and/or 6) refresh the target UI element with those values.

For example, referring to FIG. 2B, responsive to triggering control UI element 216 with label 218B, these functions or methods may include 1) selecting the identifier associated with the selection of control UI element 216 (i.e., ID 233B); 2) selecting the mapping of values identified by that identifier (i.e., mapping 239B); 3) selecting the one or more values of that mapping to be used (e.g., grouping 236B and/or measure 238B), based on the type of interaction (e.g., change grouping and/or change measure); 4) updating the properties of target UI element 220 with those values (i.e., grouping 236B and/or measure 238B); 5) retrieve data associated with those values (e.g., from datasource(s) 136); and/or 6) refresh target UI element 220 with that data.

The extent of the generated code depends in part on the GUI environment in which the dashboard is displayed. Thus, generating code may involve determining one or more target GUI environments in which the dashboard is to be displayed. For example, in some implementations, certain functionality can be performed generically and/or automatically by the GUI environment and/or dashboard service. For example, in some implementations, the GUI environment (e.g., via a JavaScript framework) may provide that changing the value of a target UI element's property automatically causes that target UI element to be refreshed, and/or cause data associated with that property to be retrieved. In other implementations, the dashboard service may provide for generically 1) looking up an identifier for a mapping of values in a table associated with the control UI element; 2) looking up the mapping of values identified by that identifier in the table; 3) using the type of interaction stored in the definition for the interaction to select the one or more values of that mapping to be used; etc. Handling operations generically and/or automatically rather than through generated code may be facilitated by optional use of a metadata repository 130 and UI element definitions, dashboard definitions, and/or interaction definitions stored therein.

By way of example, implementations may generate code for a dashboard in salesforce.com, inc.'s analytics services. In such an implementation, generating code may include generating JavaScript corresponding to a selection binding, as described in salesforce.com, inc's Analytics Binding Developer Guide. Specifically, in implementations where a step is used as a table, generating JavaScript includes generating a binding function to allow for a mapping of values in the table to be used to update one or more properties of the target UI element. The binding function may include a "cell" function which references 1) the table associated with the control UI element; 2) a row index in that table, corresponding to the row which includes the mapping of values; and 3) one or more columns of that table.

From block 465 and block 470, flow passes to optional block 475. In block 475, the generated code is displayed to allow editing of the generated code. Displaying the generated code may include displaying the generated code as source code 435 in source code viewer 430. Alternatively, the generated code may be displayed in a GUI window or otherwise as previously discussed. From block 475, flow passes to block 480.

In block 480, edited code is received. Edited code may provide additional or modified functionality relative to the generated code. For example, edited code may provide for integration with additional systems (e.g., logging systems, alert notification systems, reporting systems) or additional dashboard functionality (e.g., other UI elements, other dashboard services). However, edited code may include and/or result in errors. For example, edited code may include syntax or logical errors. When executed, edited code may result in runtime errors. Optionally, after retrieving edited code, the edited code may be checked for errors. This could include using a lexer and/or parser to identify syntax errors, and/or executing the edited code in a sandbox environment to determine whether runtime errors occur. In some implementations, edited code that is received is stored together with the definition for the interaction, such that the edited code can be referenced by the dashboard as necessary.

Exemplary Users

The term "user" is a generic term referring to an entity (e.g., an individual person) using a system and/or service. The term multi-tenant system (also known as a multi-tenant architecture) refers to a system in which various elements of hardware and/or software of the system may be shared by one or more tenants. A multi-tenant system may be operated by a first entity (sometimes referred to as an operator) that provides one or more services (e.g., an on-demand database service, a customer relationship management (CRM) service) to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

Exemplary Datasources

A datasource is a source of data for a dashboard. One or more UI elements in a dashboard may be based on one or more datasources and/or display data from those datasources. A datasource may provide filtered or unfiltered data. Datasources may include one or more databases (e.g., SQL and/or NoSQL databases), one or more Online Analytical Processing (OLAP) cubes, one or more data warehouses and/or data lakes, one or more files (e.g., a spreadsheet file (e.g., a Microsoft Excel workbook), a comma-separated value (CSV) file, an Extensible Markup Language (XML) file, etc.) or portions of files (e.g., one or more worksheets or spreadsheet tables), one or more websites, webservices, and/or software services (e.g., Salesforce), one or more big data tools (e.g., Apache Hadoop, Apache Spark, Map/Reduce clusters, etc.), messaging middleware (e.g., an enterprise data bus, a message queue, etc.), data feeds and/or data streams, DAAS offerings, etc.

A database may comprise one or more database objects that are managed by a database management system (DBMS), each database object may include a set of records, and each record may comprise a set of fields. A record may take different forms based on the database model being used and/or the specific database object to which the record belongs; e.g., a record may be: 1) a row in a table of a relational database; 2) a JavaScript Object Notation object; 3) an XML document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In a relational database management system, each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the field belongs. By way of example, a CRM database may include a table that describes a customer with fields for contact information such as name, address, phone number, fax number, etc. The database may also contain tables with records associated with consent values for persons belonging to that customer.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 5A:
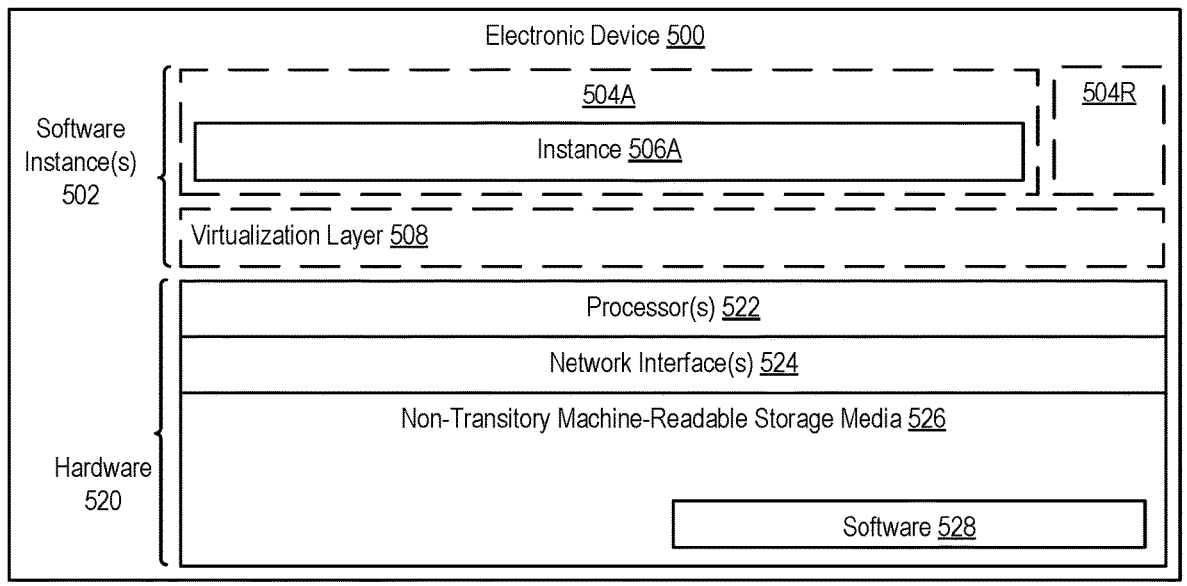
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described end user clients and the dashboard service may be implemented in one or more electronic devices 500. In one implementation: 1) each of the end user clients is implemented in a separate one of the electronic devices 500 (e.g., in user electronic devices operated by users where the software 528 represents the software to implement end user clients to interface with the dashboard service (e.g., a web browser, a native client, a portal, a command-line interface, and/or an API based upon protocols such as Simple Object Access Protocol (SOAP), Representational State Transfer (REST), etc.)); 2) the dashboard service is implemented in a separate set of one or more of the electronic devices 500 (e.g., a set of one or more server electronic devices where the software 528 represents the software to implement the dashboard service); and 3) in operation, the electronic devices implementing the end user clients and the dashboard service would be communicatively coupled (e.g., by a network) and would establish between them (or through one or more other layers) connections for submitting user interactions (e.g., mouse-clicks, keypresses, gestures, voice commands, etc.) to the dashboard service and returning GUI updates to the end user clients. Other configurations of electronic devices may be used in other implementations (e.g., an implementation in which the end user client and the dashboard service are implemented on a single electronic device 500).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Exemplary Environment

Figure 5B:
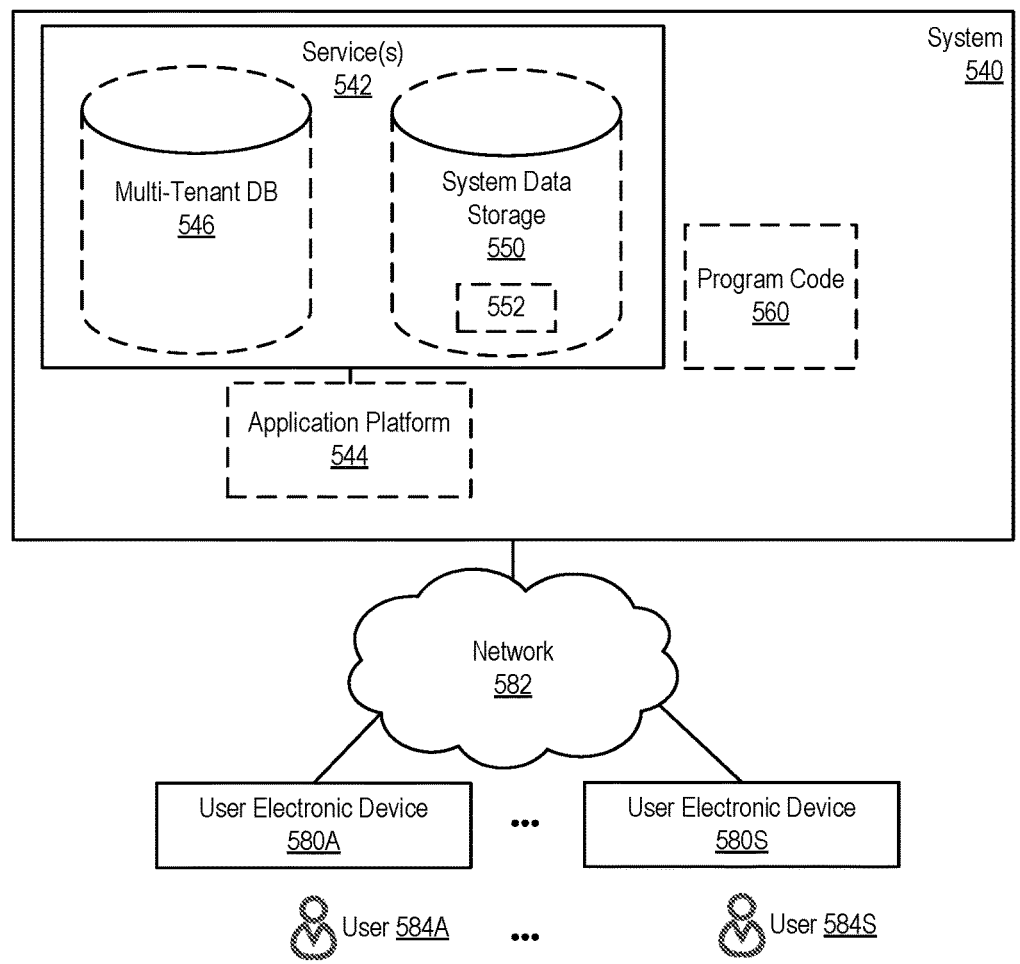
FIG. 5B is a block diagram of an environment where a dashboard service may be deployed, according to some implementations.

FIG. 5B is a block diagram of an environment where a dashboard service may be deployed, according to some implementations. A system 540 includes hardware (a set of one or more electronic devices) and software to provide service(s) 542, including the dashboard service. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communicate with each other and/or with one or more of the user electronic devices 580A-S via one or more APIs (e.g., a Representational State Transfer (REST) API). The user electronic devices 580A-S are operated by users 584A-S.

In one implementation, the system 540 is a multi-tenant cloud computing architecture supporting multiple services, such as the following:

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |

-continued

| Type of Service | Example Service(s) by salesforce.com, inc. |
| --- | --- |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the dashboard service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an API based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for a graphical user interface (GUI) that enables a user designing a dashboard to make selections of a first plurality of user interface (UI) elements of the GUI, rather than coding, to create an interaction between a second plurality of UI elements of the dashboard, the method comprising:
    accepting from the user a selection of one of the second plurality of UI elements as a target UI element, wherein the target UI element is a visualization based on data in a first plurality of fields of records of one or more database objects and has a plurality of properties;
    displaying a first UI element of the first plurality of UI elements that allows the user to select one from a plurality of types of interactions available for the visualization;
    accepting from the user a selection of one of the plurality of types of interactions as a currently selected type of interaction, wherein the currently selected type of interaction indicates a set of one or more of the plurality of properties whose values are to be updated;
    displaying a second UI element of the first plurality of UI elements that allows the user to select another of the second plurality of UI elements as a control UI element, wherein the control UI element allows for selection between first and second identifiers that identify respectively for the set of properties a first mapping of values associated with the first plurality of fields of records of one or more database objects and a second mapping of values associated with a different plurality of fields of records of one or more database objects;
    accepting from the user a selection of the another of the second plurality of UI elements as the control UI element;
    storing in a definition for the interaction the currently selected type of interaction, an identifier for the target UI element, and an identifier for the control UI element;
    generating code to implement the interaction based on the stored definition for the interaction;
    displaying in the dashboard the control UI element and the visualization based on values corresponding to the first mapping of values; and
    executing the generated code to perform the interaction responsive to a user interaction triggering the control UI element, the performance of the interaction including the following,
        updating the set of properties of the visualization with values corresponding to the second mapping of values to display a refreshed visualization.

2. The method of claim 1, further comprising:
    suggesting the plurality of types of interactions to the user based on at least the selection of the visualization.

3. The method of claim 1, wherein labels associated with the first and second identifiers are displayed by the control UI element, and wherein the triggering of the control UI element includes the selection between the labels associated with the first and second identifiers.

4. The method of claim 1, further comprising:
displaying a third UI element of the first plurality of UI elements that allows the user to view the set of properties to be updated.

5. The method of claim 4,
wherein the third UI element is a table which includes a set of one or more columns and a plurality of rows,
wherein the set of columns includes one or more columns each corresponding to a different property of the set of properties,
wherein the plurality of row includes first and second rows, and wherein the first row includes the first identifier and the first mapping of values and the second row includes the second identifier and the second mapping of values.

6. The method of claim 5, wherein the table further allows the user to select the set of properties to be updated, the method further comprising:
accepting from the user a selection of the set of properties to be updated, wherein the selection of the set of properties to be updated includes selections from the set of columns of the table one or more columns corresponding to properties of the set of properties.

7. The method of claim 5, the method further comprising:
displaying a fourth of the first plurality of UI elements that allows the user to create the table; and
receiving from the user selections of the first and second rows and the set of columns for the table.

8. The method of claim 1, the method further comprising:
displaying a third UI element of the first plurality of UI elements that allows the user to display the generated code, wherein the generated code references the first and second mappings of values and the identifiers for the visualization and the control UI element.

9. The method of claim 8, further comprising:
displaying the generated code to allow editing of the generated code; and
receiving edited code.

10. The method of claim 1, wherein the visualization is based on and the set of properties includes one of a measure and a grouping, wherein the currently selected type of interaction includes a respective one of changing the measure and changing the grouping, and wherein the performing the interaction further includes:
retrieving data from the different plurality of fields that is associated with the second mapping of values; and
refreshing the visualization with that data.

11. The method of claim 1, wherein the performing the interaction further includes updating the set of properties of another target UI element with the values corresponding to the second mapping, the method further comprising:
accepting from the user a selection of yet another of the second plurality of UI elements as the another target UI element, wherein the another target UI element has properties including the set of properties whose values are to be updated;
storing in the definition for the interaction an identifier for the another target UI element; and
displaying in the dashboard the another target UI element based on the values corresponding to the first mapping.

12. A non-transitory machine-readable medium that stores instructions that, when executed by a processor, are operable to cause the processor to perform operations that enable a user designing a dashboard with a graphical user interface (GUI) to make selections of a first plurality of user interface (UI) elements of the GUI, rather than coding, to create an interaction between a second plurality of UI elements of the dashboard, the operations comprising:
accepting from the user a selection of one of the second plurality of UI elements as a target UI element, wherein the target UI element is a visualization based on data in a first plurality of fields of records of one or more database objects and has a plurality of properties;
displaying a first UI element of the first plurality of UI elements that allows the user to select one from a plurality of types of interactions available for the visualization;
accepting from the user a selection of one of the plurality of types of interactions as a currently selected type of interaction, wherein the currently selected type of interaction indicates a set of one or more of the plurality of properties whose values are to be updated;
displaying a second UI element of the first plurality of UI elements that allows the user to select another of the second plurality of UI elements as a control UI element, wherein the control UI element allows for selection between first and second identifiers that identify respectively for the set of properties a first mapping of values associated with the first plurality of fields of records of one or more database objects and a second mapping of values associated with a different plurality of fields of records of one or more database objects;
accepting from the user a selection of the another of the second plurality of UI elements as the control UI element;
storing in a definition for the interaction the currently selected type of interaction, an identifier for the target UI element, and an identifier for the control UI element;
generating code to implement the interaction based on the stored definition for the interaction;
displaying in the dashboard the control UI element and the visualization based on values corresponding to the first mapping of values; and
executing the generated code to perform the interaction responsive to a user interaction triggering the control UI element, the performance of the interaction including the following,
updating the set of properties of the visualization with values corresponding to the second mapping of values to display a refreshed visualization.

13. The non-transitory machine-readable medium of claim 12, further comprising instructions that, when executed by the processor, are operable to cause said processor to perform further operations comprising:
suggesting the plurality of types of interactions to the user based on at least the selection of the visualization.

14. The non-transitory machine-readable medium of claim 12, wherein labels associated with the first and second identifiers are displayed by the control UI element, and wherein the triggering of the control UI element includes the selection between the labels associated with the first and second identifiers.

15. The non-transitory machine-readable medium of claim 12, further comprising instructions that, when executed by the processor, are operable to cause said processor to perform further operations comprising:
displaying a third UI element of the first plurality of UI elements that allows the user to view the set of properties to be updated.

16. The non-transitory machine-readable medium of claim 15,
wherein the third UI element is a table which includes a set of one or more columns and a plurality of rows, wherein the set of columns includes one or more columns each corresponding to a different property of the set of properties, wherein the plurality of row includes first and second rows, and wherein the first row includes the first identifier and the first mapping of values and the second row includes the second identifier and the second mapping of values.

17. The non-transitory machine-readable medium of claim 16, wherein the table further allows the user to select the set of properties to be updated, the non-transitory machine-readable medium further comprising instructions that, when executed by the processor, are operable to cause said processor to perform further operations comprising:

accepting from the user a selection of the set of properties to be updated, wherein the selection of the set of properties to be updated includes selections from the set of columns of the table one or more columns corresponding to properties of the set of properties.

18. The non-transitory machine-readable medium of claim 16, further comprising instructions that, when executed by the processor, are operable to cause said processor to perform further operations comprising:

displaying a fourth of the first plurality of UI elements that allows the user to create the table; and receiving from the user selections of the first and second rows and the set of columns for the table.

19. The non-transitory machine-readable medium of claim 12, further comprising instructions that, when executed by the processor, are operable to cause said processor to perform further operations comprising:

displaying a third UI element of the first plurality of UI elements that allows the user to display the generated code, wherein the generated code references the first and second mappings of values and the identifiers for the visualization and the control UI element.

20. The non-transitory machine-readable medium of claim 19, further comprising instructions that, when executed by the processor, are operable to cause said processor to perform further operations comprising:

displaying the generated code to allow editing of the generated code; and receiving edited code.

21. The non-transitory machine-readable medium of claim 12, wherein the visualization is based on and the set of properties includes one of a measure and a grouping, wherein the currently selected type of interaction includes a respective one of changing the measure and changing the grouping, and wherein the performing the interaction further includes:

retrieving data from the different plurality of fields that is associated with the second mapping of values; and refreshing the visualization with that data.

22. The non-transitory machine-readable medium of claim 12, wherein the performing the interaction further includes updating the set of properties of another target UI element with the values corresponding to the second mapping, the non-transitory machine-readable medium further comprising instructions that, when executed by the processor, are operable to cause said processor to perform further operations comprising:

accepting from the user a selection of yet another of the second plurality of UI elements as the another target UI element, wherein the another target UI element has properties including the set of properties whose values are to be updated;

storing in the definition for the interaction an identifier for the another target UI element; and displaying in the dashboard the another target UI element based on the values corresponding to the first mapping.

* * * * *